US008678419B2

(12) United States Patent
Glazner

(10) Patent No.: US 8,678,419 B2
(45) Date of Patent: *Mar. 25, 2014

(54) SYSTEMS AND METHODS FOR CONNECTING A POWER SUPPLY TO A TRAILER

(76) Inventor: Joseph Karl Glazner, Grapeland, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/403,732

(22) Filed: Feb. 23, 2012

(65) Prior Publication Data

US 2012/0153597 A1 Jun. 21, 2012

Related U.S. Application Data

(63) Continuation-in-part of application No. 12/876,061, filed on Sep. 3, 2010, now Pat. No. 8,262,119.

(51) Int. Cl.
*B60D 1/62* (2006.01)
(52) U.S. Cl.
USPC ............ 280/422; 280/421; 280/434; 280/420
(58) Field of Classification Search
USPC .................................. 280/422, 421, 420, 434
See application file for complete search history.

(56) References Cited

U.S. PATENT DOCUMENTS

| 2,119,460 | A | * | 5/1938 | Gurton et al. | 280/421 |
|---|---|---|---|---|---|
| 3,116,940 | A | | 1/1964 | Jines | |
| 3,328,741 | A | | 6/1967 | Brown | |
| 3,825,921 | A | | 7/1974 | Marus et al. | |
| 3,858,907 | A | | 1/1975 | Van Raden | |
| 3,941,408 | A | * | 3/1976 | Petersson | 280/421 |
| 4,283,072 | A | | 8/1981 | Deloach, Jr. | |
| 4,738,463 | A | | 4/1988 | Poore et al. | |
| 5,044,653 | A | * | 9/1991 | Savanella | 280/421 |
| 5,346,239 | A | * | 9/1994 | Wohlhuter | 280/420 |
| 6,222,443 | B1 | | 4/2001 | Beeson et al. | |
| 6,481,738 | B1 | | 11/2002 | Duncan et al. | |
| 7,581,746 | B2 | | 9/2009 | Abate et al. | |
| 7,621,552 | B2 | | 11/2009 | Bergum et al. | |

\* cited by examiner

*Primary Examiner* — Kevin Hurley
*Assistant Examiner* — Michael Stabley
(74) *Attorney, Agent, or Firm* — Shannon W. Bates; Klemchuk Kubasta LLP

(57) ABSTRACT

Embodiments of the present disclosure generally provide systems and methods for connecting a power supply of a tow vehicle to a trailer. The system may comprise a connector plate coupled to a hitching member. The connector plate may define a curvilinear slot that receives a first connector. The curvilinear slot may allow the connector plate to rotate with respect to the first connector. A retention spring may be coupled to the first connector. In various embodiments, the hitching member may be a tongue of a fifth wheel trailer or a downward extending member of a gooseneck trailer.

20 Claims, 30 Drawing Sheets

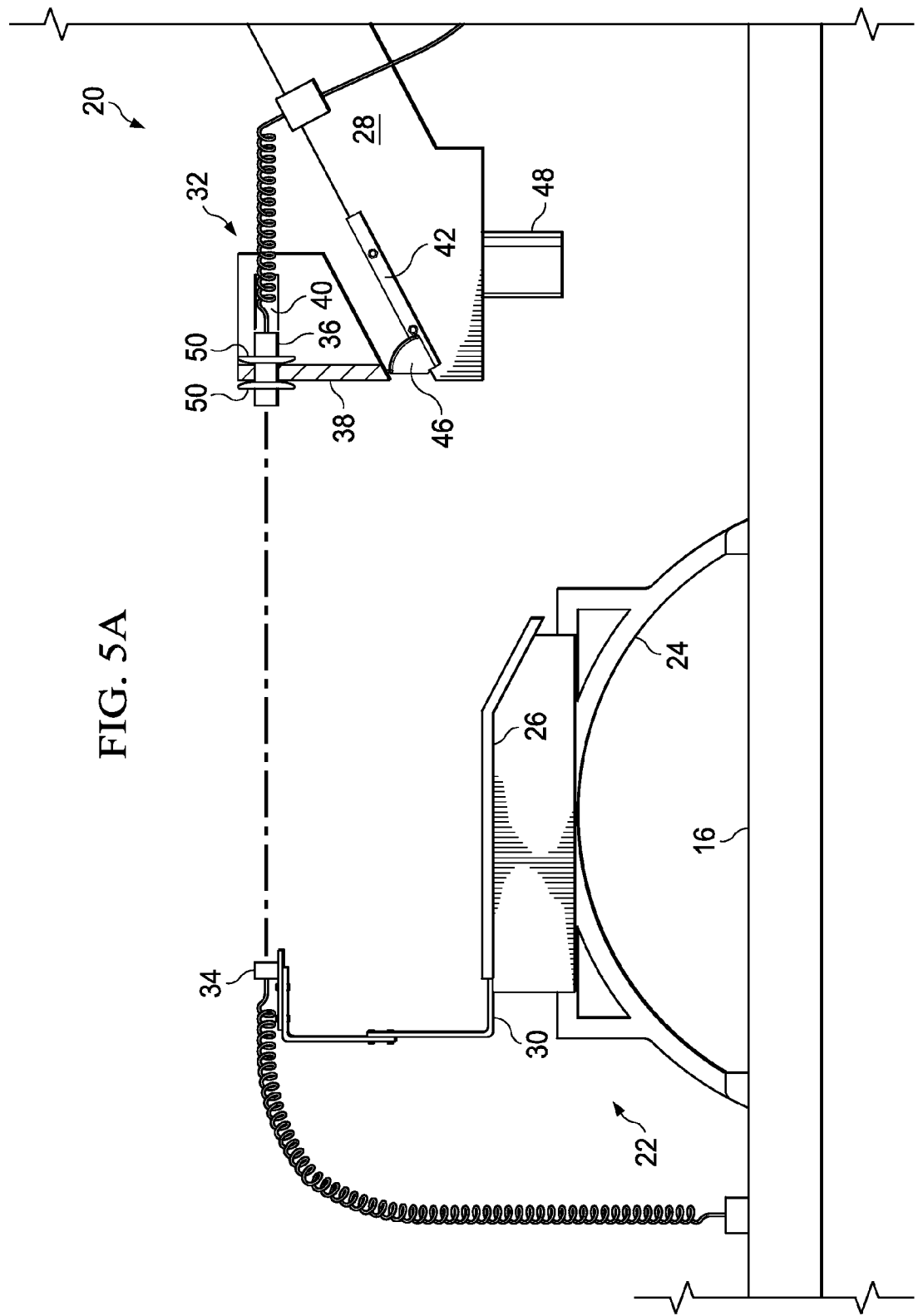

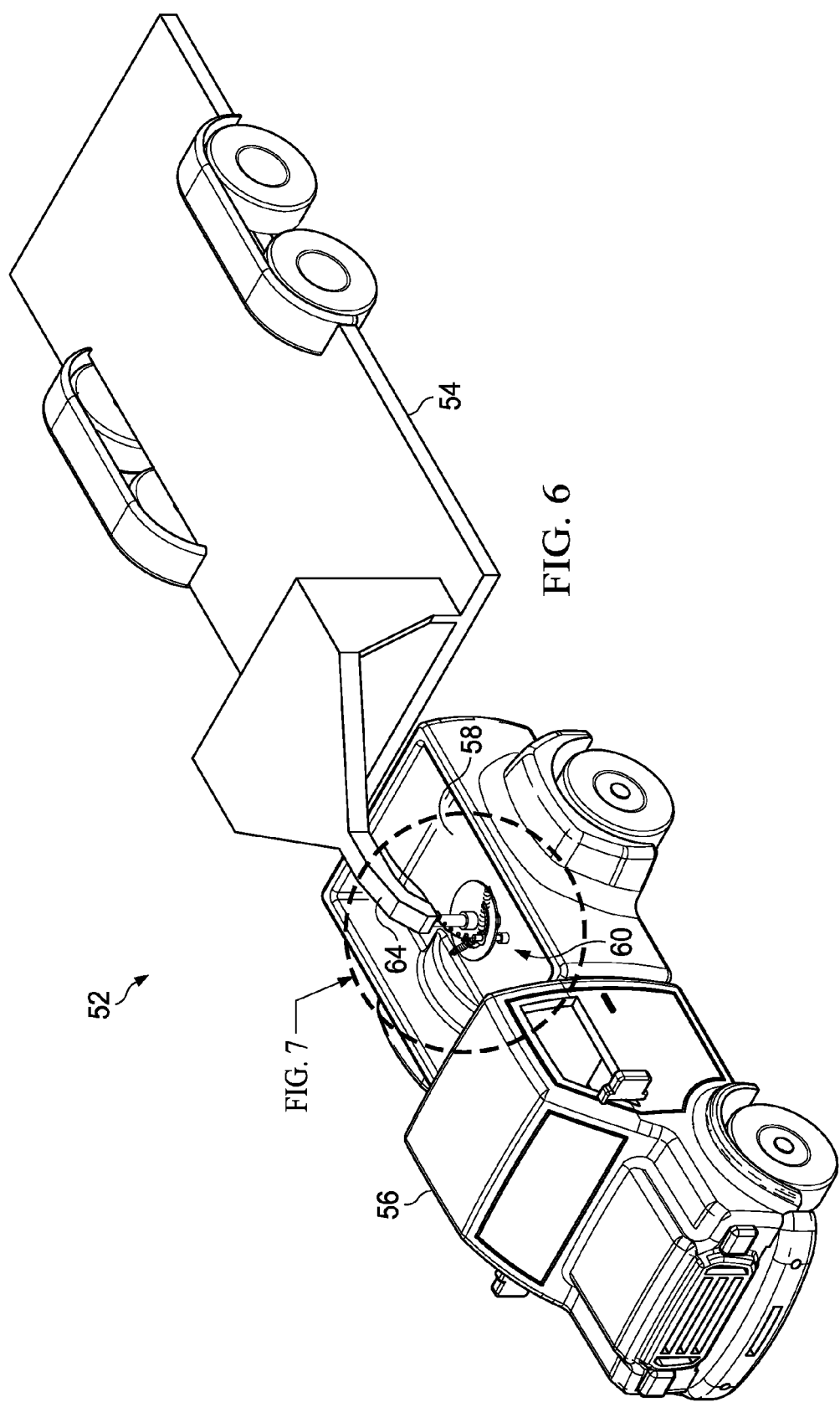

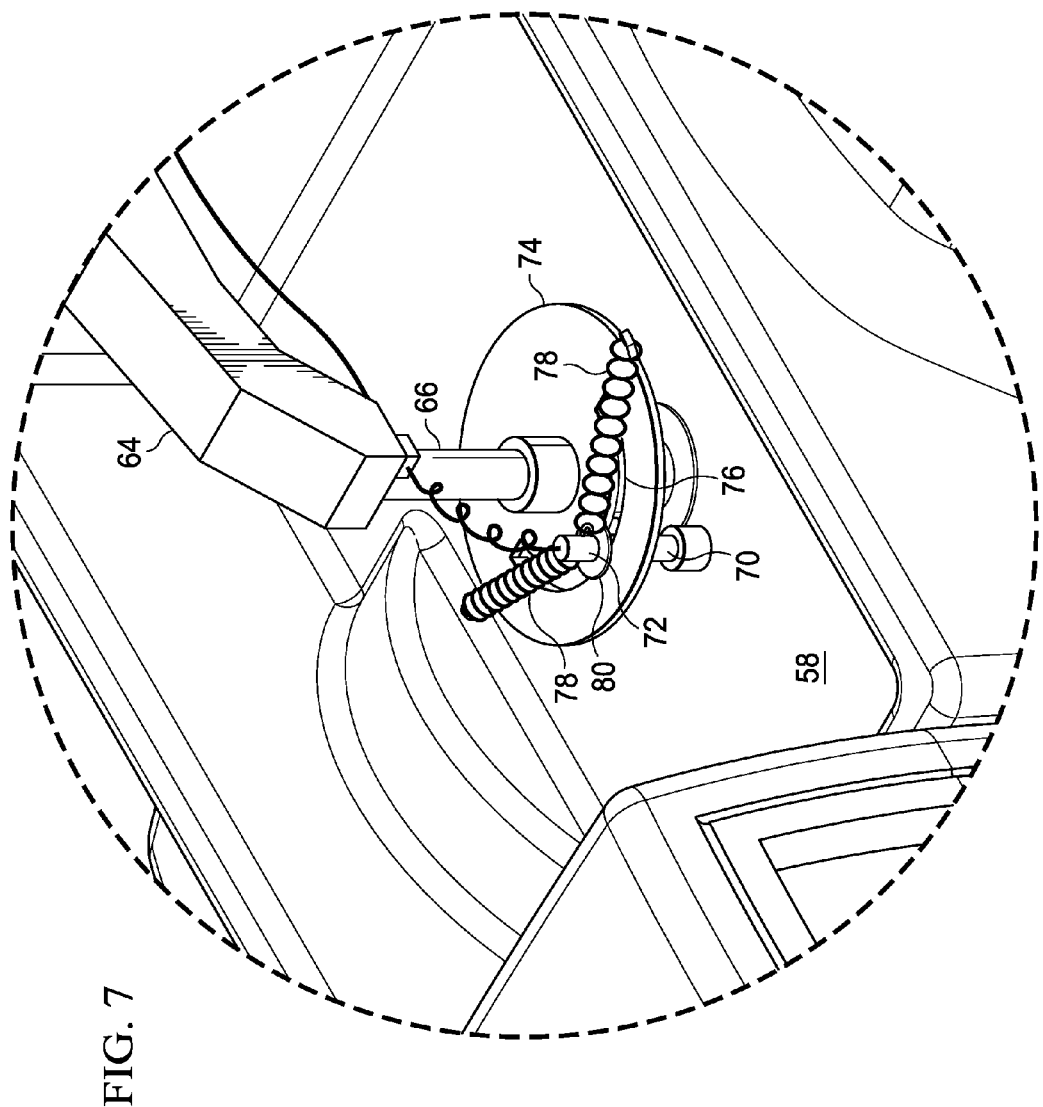

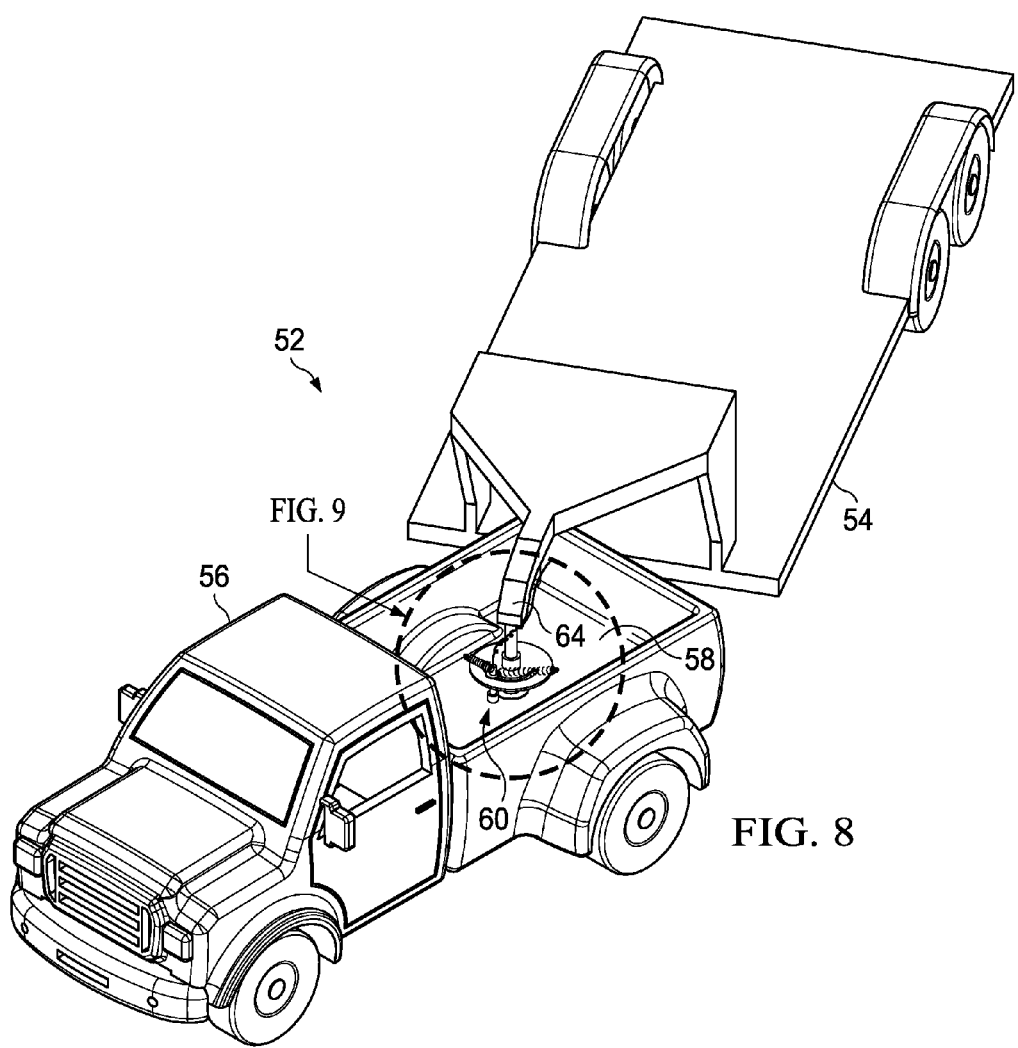

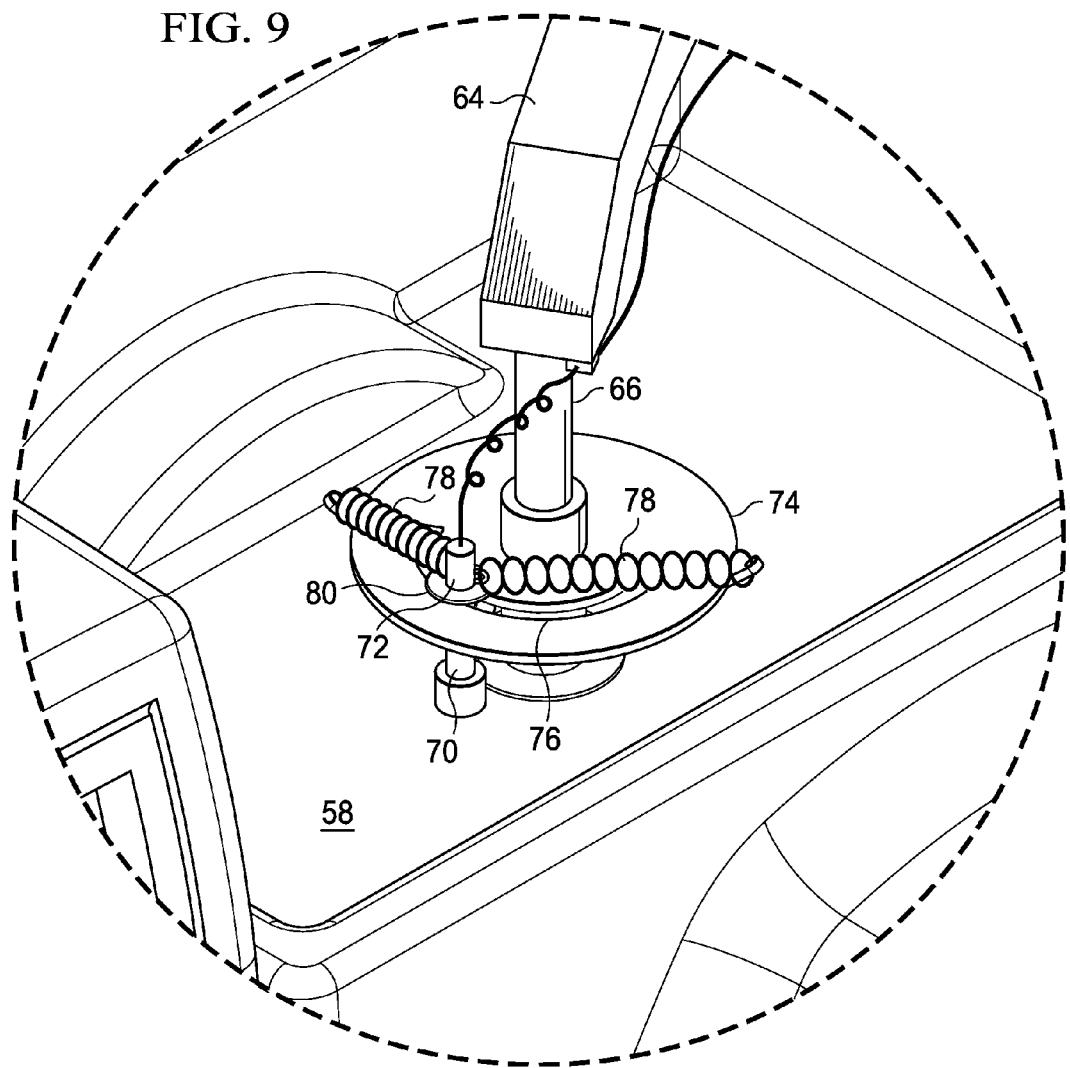

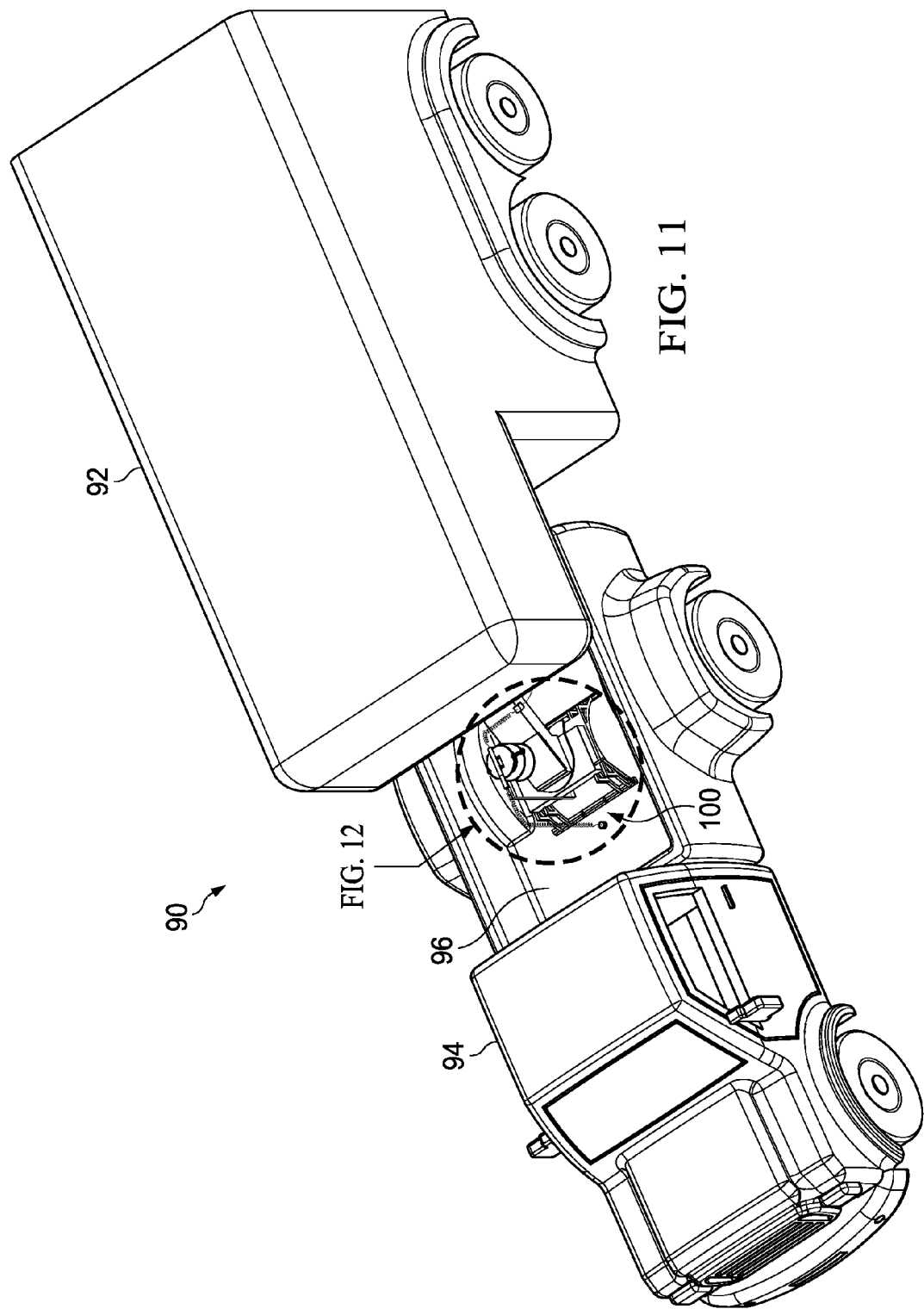

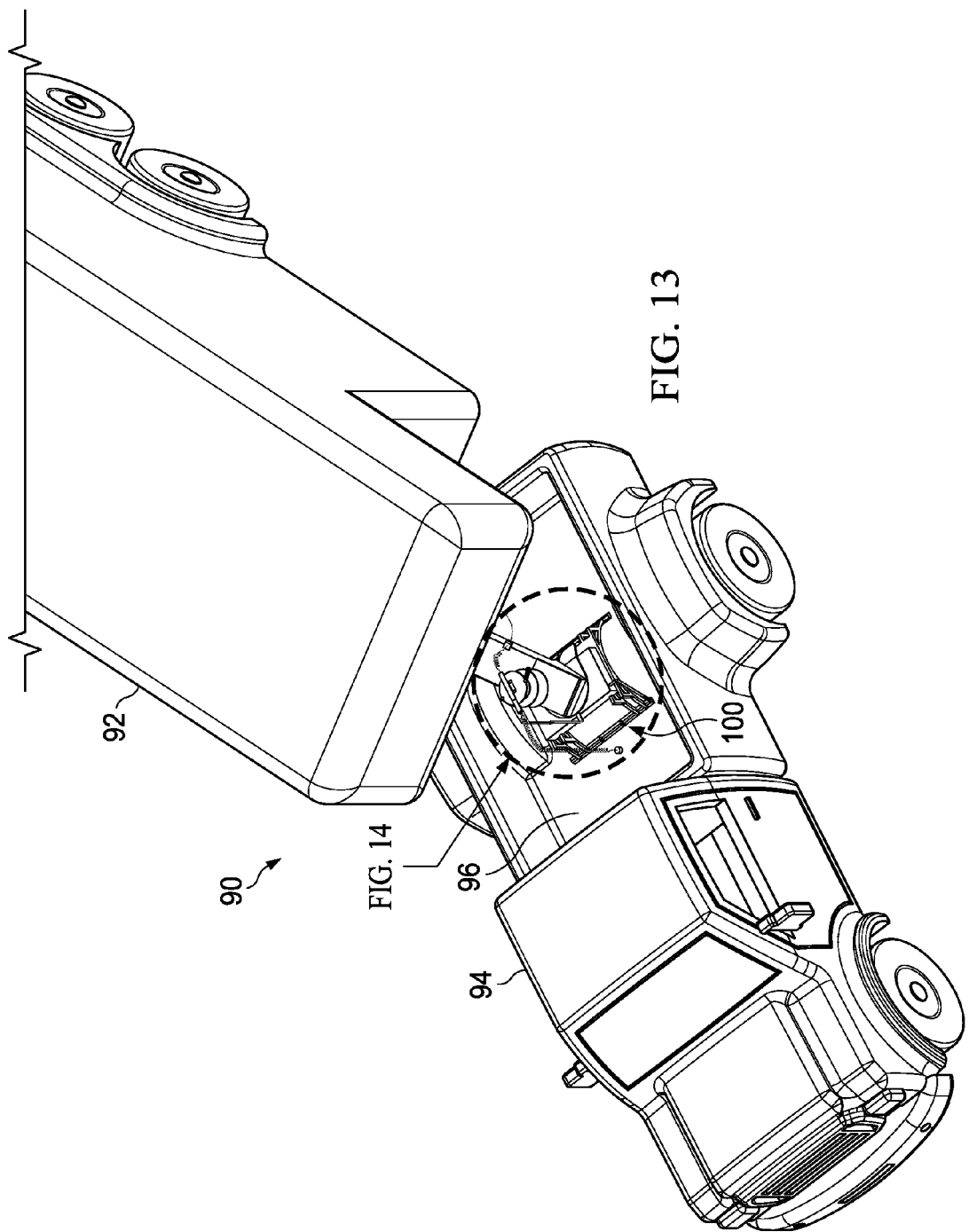

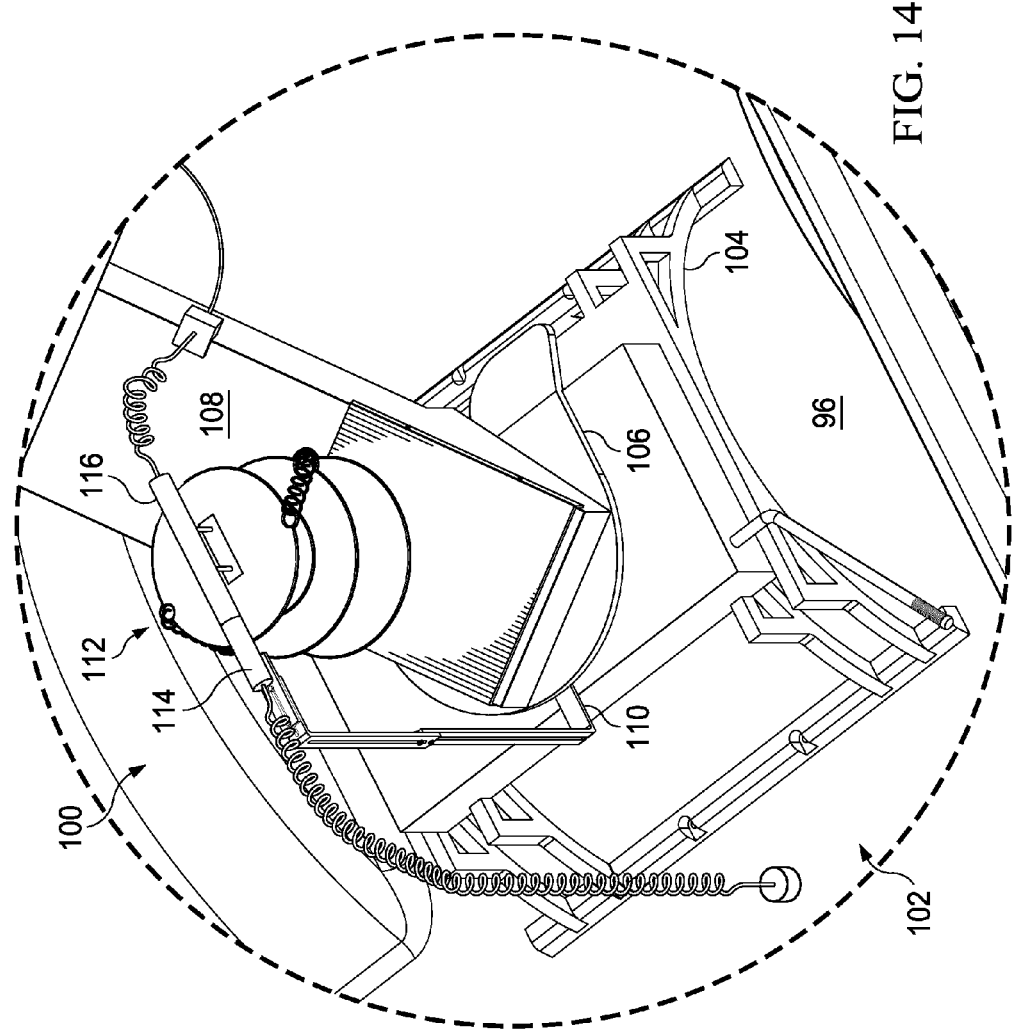

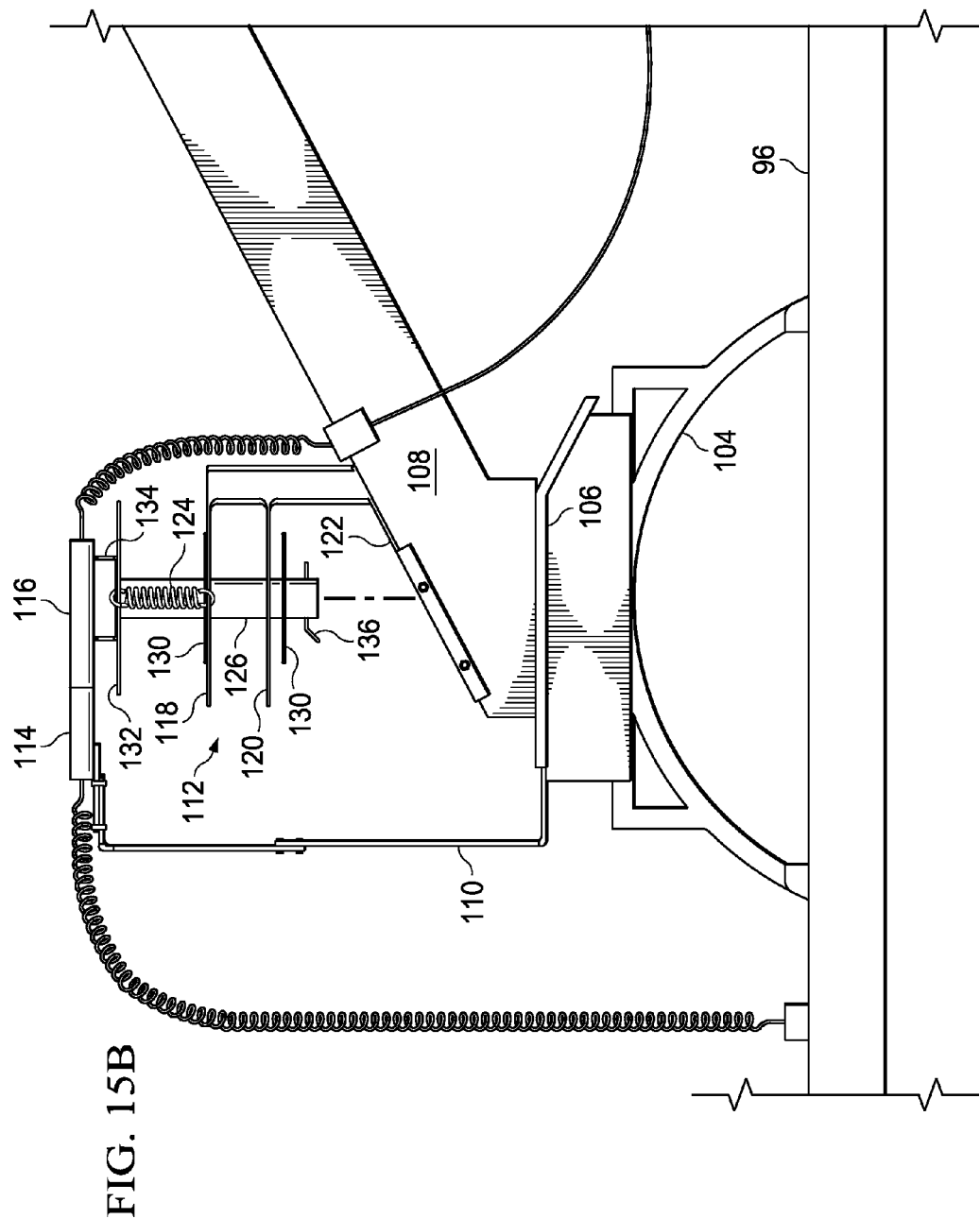

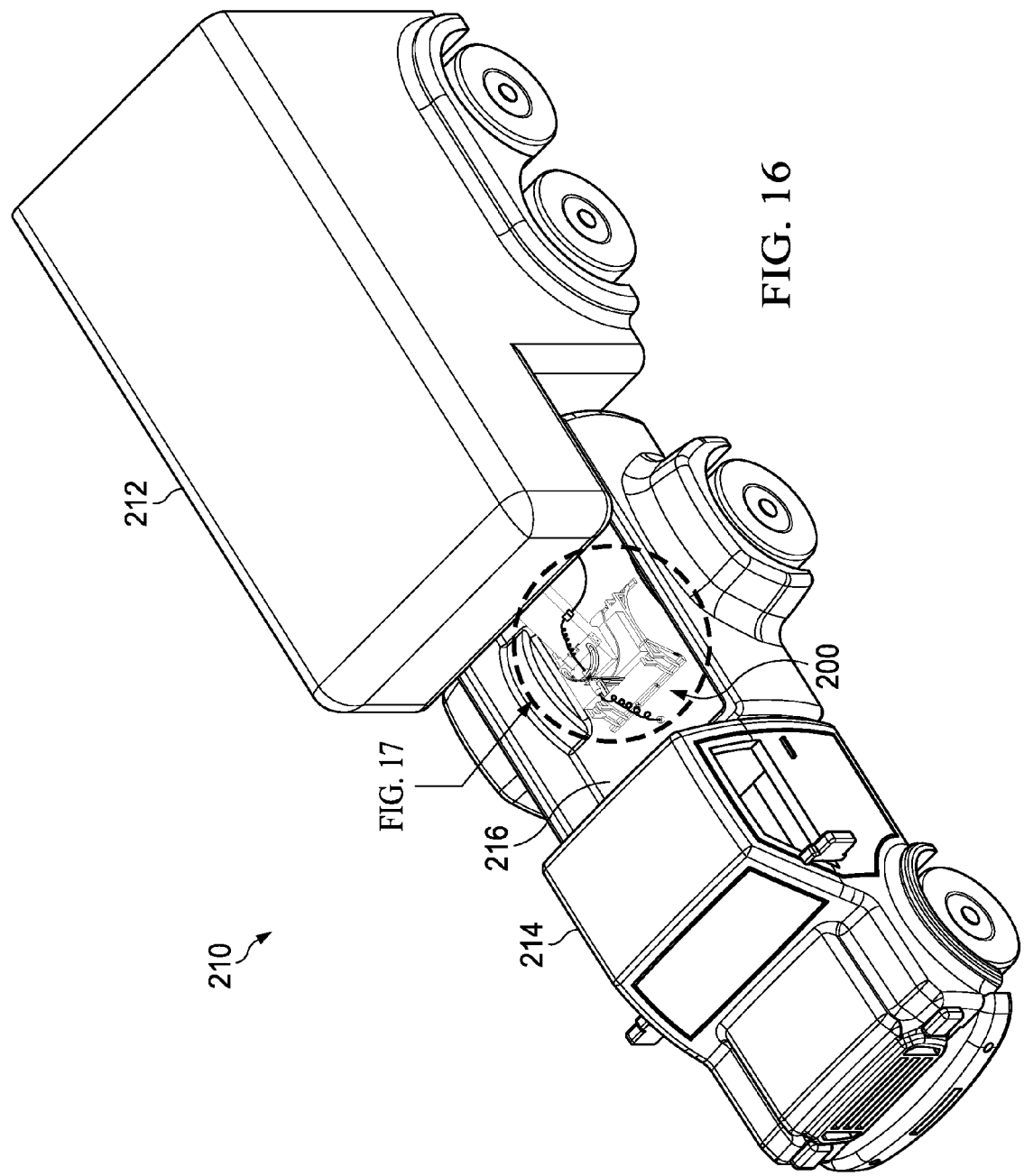

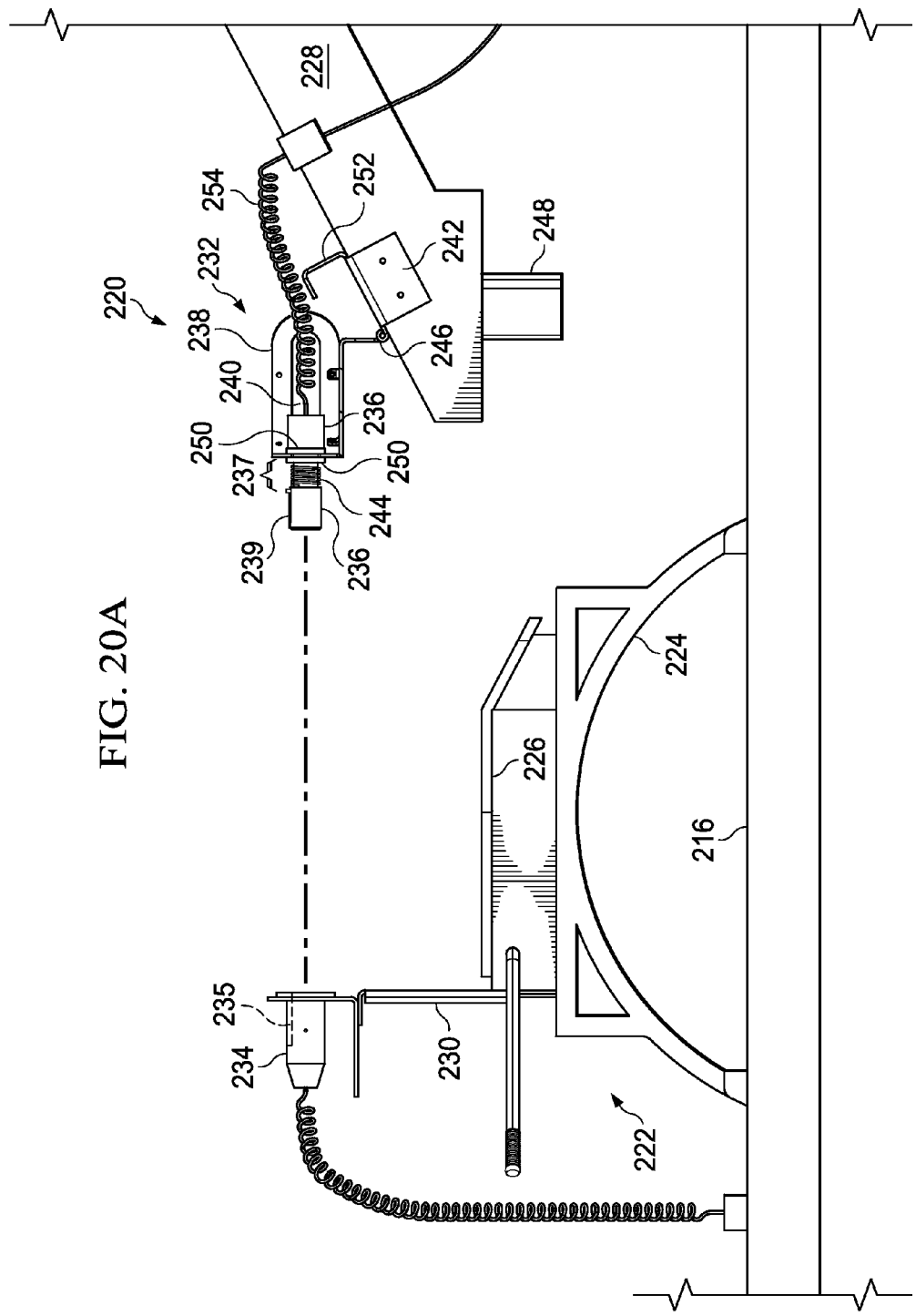

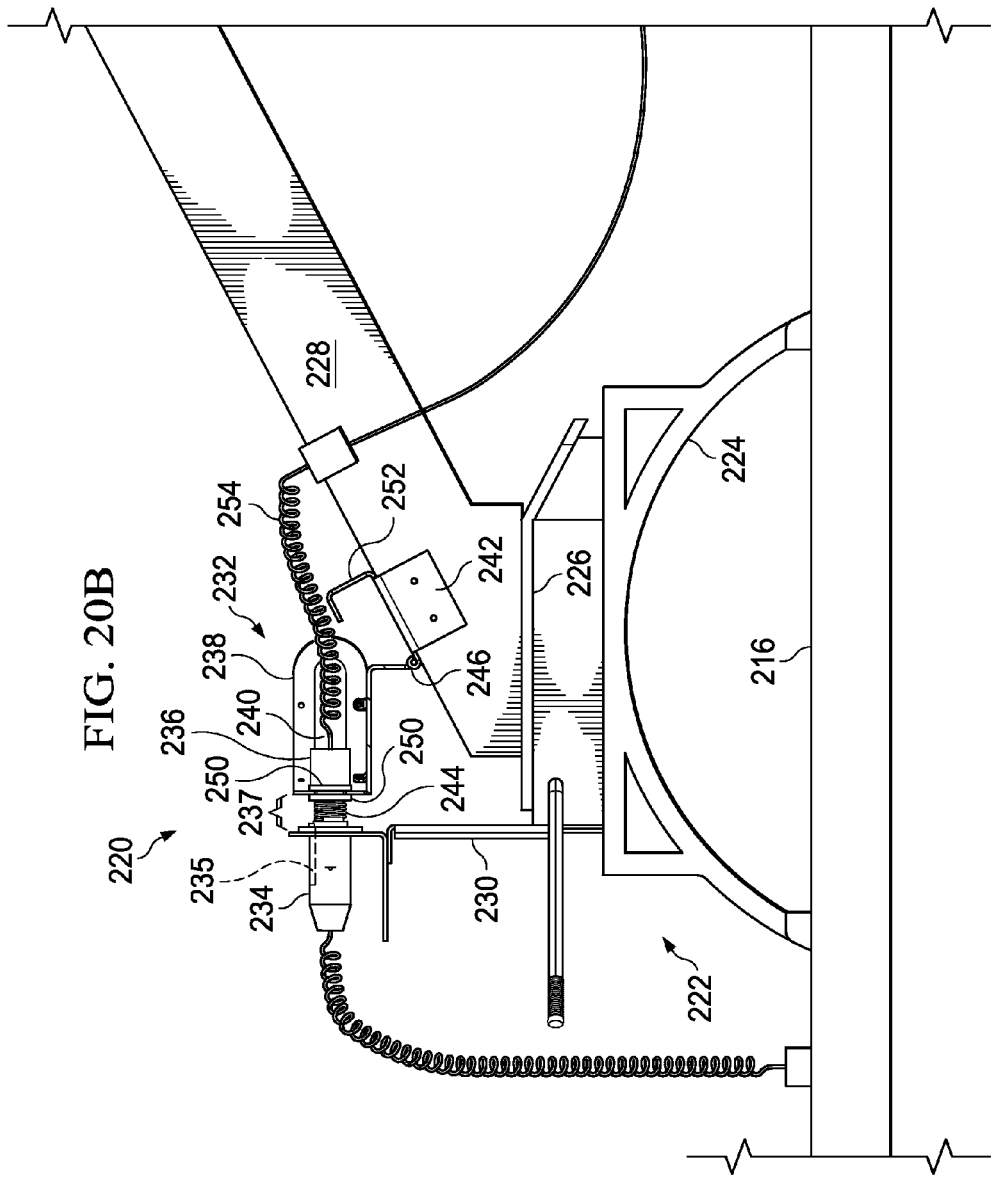

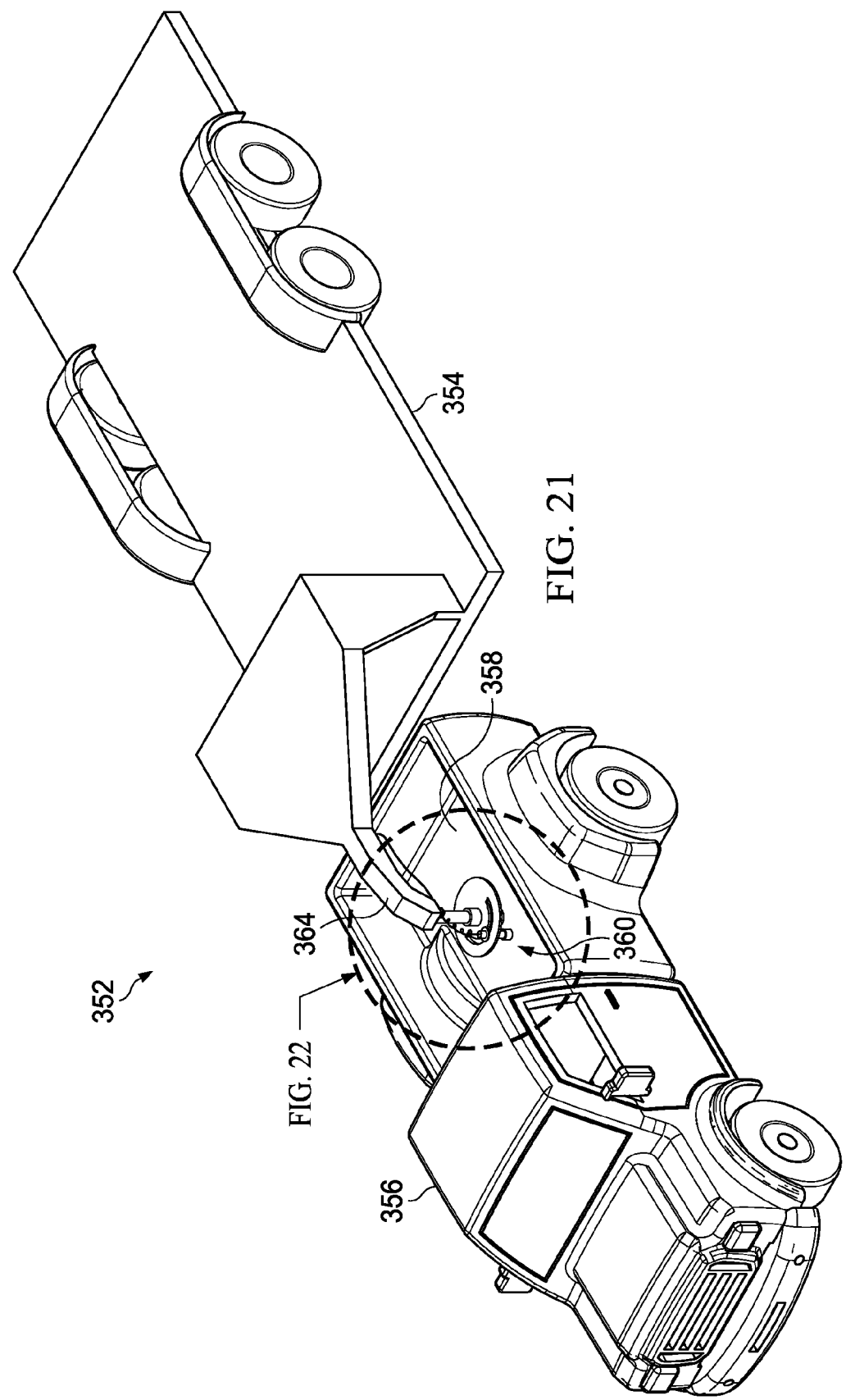

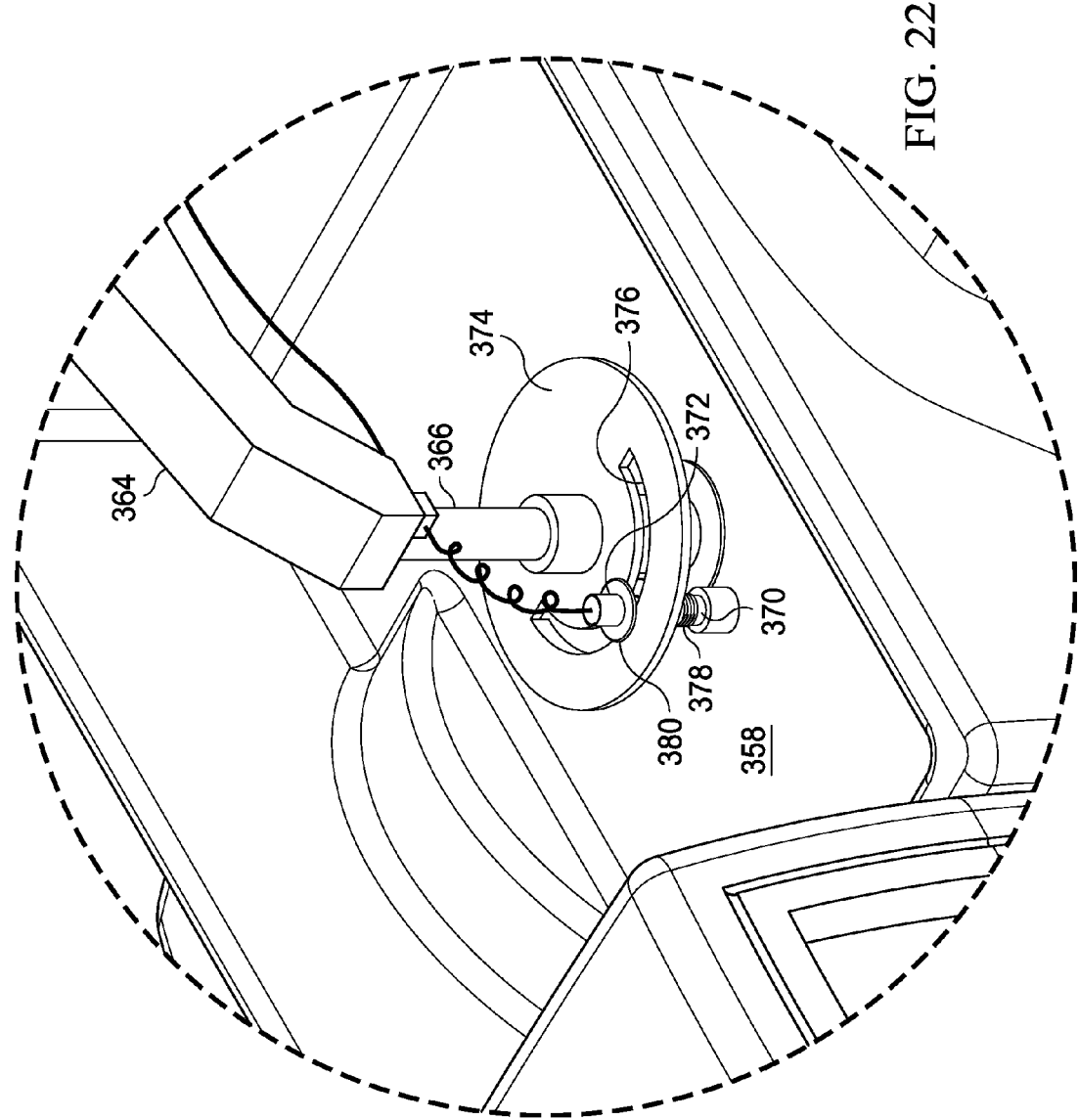

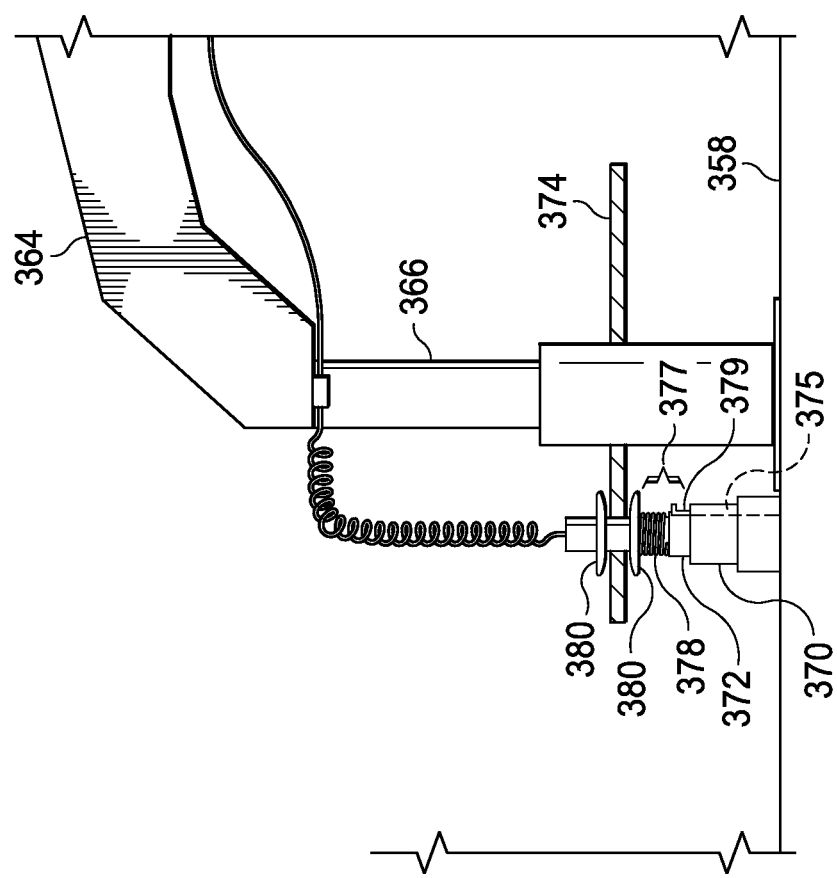

SYSTEMS AND METHODS FOR CONNECTING A POWER SUPPLY TO A TRAILER

CROSS REFERENCE TO RELATED APPLICATION

This application is a continuation-in-part of U.S. patent application Ser. No. 12/876,061, filed Sep. 3, 2010 and entitled "Systems and Methods for Connecting a Power Supply To a Trailer," hereby incorporated by reference for all purposes.

BACKGROUND OF THE DISCLOSURE

The present disclosure generally relates to trailer connection systems, and more particularly to systems for connecting a power supply of a tow vehicle to a trailer.

BACKGROUND

There are a variety of ways to hitch a trailer to a tow vehicle. For example, bumperpull, ball and socket, fifth-wheel, and gooseneck type trailer hitches are common. A ball and socket arrangement may be used for light duty applications, while heavy duty applications may require a fifth wheel or gooseneck arrangement. A semi-trailer truck is an example of a heavy-duty application that might employ a fifth wheel or gooseneck trailer hitch.

A fifth wheel hitch may employ a ramp and skid plate that guides a hitch pin into a retaining slot defined by the hitch plate. Two spring-loaded locking arms may capture the hitch pin. In a common gooseneck type of hitch mechanism, a ball is typically mounted to the middle of a pickup truck bed and the socket mechanism is fastened to the trailer frame that reaches up, over and down into the pickup truck bed. Each of the fifth wheel and gooseneck types of hitching mechanisms allows the trailer limited roll and pitch, while allowing the trailer to rotate (yaw) significantly with respect to the tow vehicle when the tow vehicle turns while towing the trailer.

The electrical, hydraulic, air, or coolant connection is typically manually made with a multi-conductor connector or connectors. One side of the connector may have a cable wired to the trailer and the other side of the connector may be wired to the tow vehicle. The connection may provide power for lighting and braking of the trailer.

SUMMARY

Embodiments of the present disclosure generally provide systems and methods for connecting a power supply of a tow vehicle to a trailer. The system includes a connector plate that may be configured to be coupled to a hitching member. The connector plate may define a curvilinear slot that may be configured to receive a first connector. The curvilinear slot may allow the connector plate to rotate with respect to the first connector. A retention spring may be configured to be coupled to the first connector. In certain embodiments, the hitching member may be a downward extending member of a gooseneck trailer. In other embodiments, the hitching member may be a tongue of a fifth wheel trailer.

Additional embodiments of the power supply connection system of the present disclosure may include a platform that may be configured to be coupled to a trailer connector of a fifth wheel trailer. A rod may be coupled to the platform. A plate may be coupled to a tongue of the fifth wheel trailer. The plate may define an aperture that receives the rod and allows the plate to rotate with respect to the rod. A retention spring may be coupled to the platform and the plate.

Technical advantages of the embodiments described in the present disclosure include the ability to approximately simultaneously connect the mechanical hitch and the power source in a single hitching action. In addition, the systems of the present disclosure may be adaptable to a variety of standard conventional hitching systems without significant modification of the conventional system.

Another technical advantage of embodiments of the present disclosure includes a hitching system that may be backward compatible. That is, a trailer or tow vehicle equipped with a system for connecting a power supply according to embodiments of the present disclosure may be fully compatible to be hitched with a corresponding trailer or tow vehicle that is not so equipped.

Yet another technical advantage of the present disclosure includes a power supply connection that may be safer than conventional hand connections because it may eliminate or reduce electrical or other types of cables that may hang dangerously or get caught on features of or items in a bed of a pick-up truck.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which:

FIG. 5A is an elevation view of the unhitched fifth wheel trailer hitch system shown in FIG. 2 according to an embodiment of the present disclosure;

FIG. 6 is a perspective view of a gooseneck trailer hitch system according to an embodiment of the present disclosure;

FIG. 7 is a detailed view of the gooseneck trailer hitch system shown in FIG. 6 according to the present disclosure;

FIG. 8 is a perspective view of the gooseneck trailer hitch system shown in FIG. 6 showing the trailer pivoted with respect to the tow vehicle according to an embodiment of the present disclosure;

FIG. 9 is a detailed view of the gooseneck trailer hitch system shown in FIG. 8 according to an embodiment of the present disclosure;

FIG. 11 is a perspective view of a fifth wheel trailer hitch system according to another embodiment of the present disclosure;

FIG. 13 is a perspective view of the fifth wheel trailer hitch system shown in FIG. 11 showing the trailer pivoted with respect to the tow vehicle according to an embodiment of the present disclosure;

FIG. 14 is a detailed view of the fifth wheel trailer hitch system shown in FIG. 13 according to an embodiment of the present disclosure;

FIG. 15B is an elevation view of the hitched fifth wheel trailer hitch system shown in FIG. 12 according to an embodiment of the present disclosure;

FIG. 16 is a perspective view of a fifth wheel trailer hitch system according to yet another embodiment of the present disclosure;

FIG. 20A is an elevation view of the unhitched fifth wheel trailer hitch system shown in FIG. 17 according to an embodiment of the present disclosure; and FIG. 20B is an elevation view of the hitched fifth wheel trailer hitch system shown in FIG. 17 according to an embodiment of the present disclosure.

FIG. 21 is a perspective view of a gooseneck trailer hitch system according to still another embodiment of the present disclosure;

FIG. 22 is a detailed view of the gooseneck trailer hitch system shown in FIG. 21 according to an embodiment of the present disclosure;

FIG. 25B is an elevation view of the hitched gooseneck trailer hitch system shown in FIG. 22 according to an embodiment of the present disclosure.

DETAILED DESCRIPTION

The present disclosure generally provides an improved system for hitching a trailer to a tow vehicle. In particular, the electrical, hydraulic, air (compressed), or coolant connection (or any combination thereof) of the tow vehicle and the trailer may be made approximately simultaneously when the trailer and tow vehicle are hitched. The hitch apparatus may also allow the connection to remain generally fixed while the trailer may be free to rotate and retain freedom about the hitch connection. The connection may stay connected while the trailer is allowed to rotate (yaw) during normal towing.

It should be understood that the diagrams shown in FIGS. 1-25B are for illustrative purposes only and that any other suitable trailer hitch apparatus may be used in conjunction with or in lieu of the features of the illustrated embodiments according to embodiments of the present disclosure.

Figure 1:
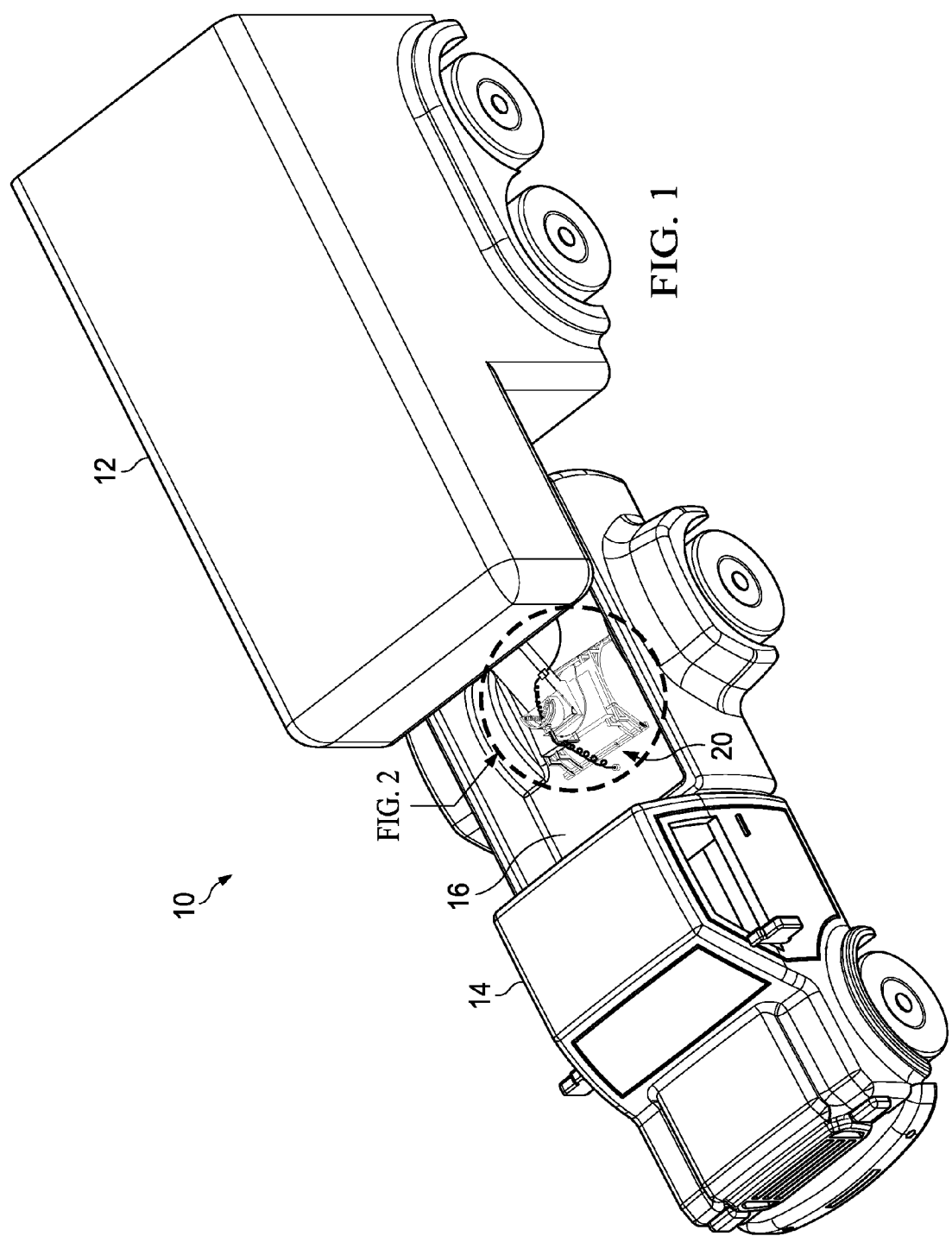
FIG. 1 is a perspective view of a fifth wheel trailer hitch system according to an embodiment of the present disclosure.
Figure 2:
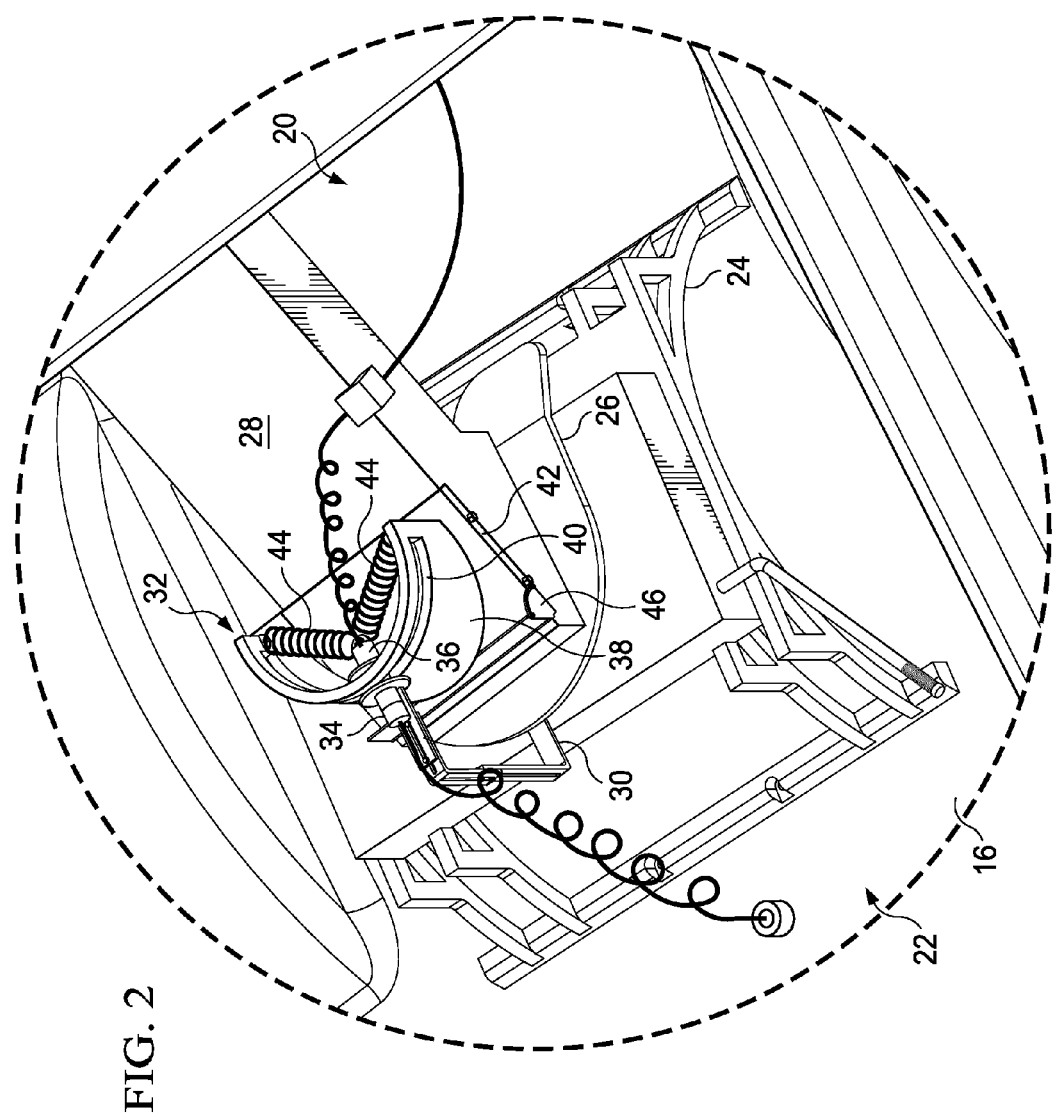
FIG. 2 is a detailed view of the fifth wheel trailer hitch system shown in FIG. 1 according to an embodiment of the present disclosure.

Referring to the drawings, and particularly to FIGS. 1-5B, a trailer hitch system 20 is shown. The embodiment of the trailer hitch system 20 shown in FIGS. 1-5B may be adaptable to a conventional fifth-wheel trailer hitch. The teachings of the present disclosure may allow a conventional hitching operation of a fifth-wheel trailer hitch to automatically connect electrical, hydraulic, compressed air, or coolant connections of a tow vehicle with corresponding connections of a trailer. FIG. 1 shows an environmental view of a towing operation 10. In the towing operation 10 depicted, a trailer 12 is connected to a tow vehicle 14 using a fifth-wheel trailer hitch modified according to an embodiment of the present disclosure. FIG. 2 is an enlarged view of the trailer hitch system 20 of FIG. 1 showing its features in more detail.

The trailer hitch system 20 may include a hitch receiver 22 that may be mounted in a bed 16 of the tow vehicle 14. The hitch receiver 22 may include a hitch frame 24 that supports a skid plate 26. The skid plate 26 defines a pin receiving slot configured to receive a hitch pin 48 of the trailer 12 (see FIG. 5A). The hitch pin 48 may also be referred to as a hitch post, a king pin, a tow pin, and the like. The hitch pin 48 may extend from a tongue 28 of the trailer 12. When coupling the trailer 12 to the tow vehicle 14, the hitch pin 48 may be guided into the pin receiving slot by the sloped entry portion of the skid plate 26. Once engaged in the receiving slot, two spring loaded locking arms capture the hitch pin and retain it. In certain embodiments, a locking bar may be inserted in the hitch receiver to further prevent the locking arms from opening and releasing the hitch pin 48.

According to an embodiment of the present disclosure, a tow vehicle bracket 30 may be attached to the hitch receiver 22 of the tow vehicle 14. The tow vehicle bracket 30 may be attached to the skid plate 26 as shown in FIG. 2. In certain embodiments, the tow vehicle bracket 30 may be attached such that it is fixed with respect to the skid plate 26. Fixing the tow vehicle bracket with respect to the skid plate 26 may allow the hitch receiver 22 to accommodate roll and pitch motions of the trailer 12. The tow vehicle bracket 30 may position a tow vehicle connector 34 where it may be connected to a trailer connector 36 when the trailer 12 is connected to the tow vehicle 14. The tow vehicle connector 34 may allow power for lighting and breaking to be transmitted from the tow vehicle 14 to the trailer 12. In certain embodiments, the tow vehicle connector 34 may be a hydraulic, compressed air, or coolant connection. The tow vehicle connector 34 may be adjustable vertically and horizontally to allow manual adjustment of the height and depth of the tow vehicle connector 34. This adjustability may be accomplished with the slot illustrated in the tow vehicle bracket 30. The tow vehicle bracket 30 may hold the tow vehicle connector 34 substantially fixed relative to the components of a trailer hitch system 20.

On the trailer 12 side of the trailer hitch system 20, there may be a trailer connector 36 generally positioned by a trailer bracket 32. The trailer bracket 32 may generally be formed from aluminum, steel, or other metal. The material of the trailer bracket 32 may any suitable thickness that allows for structural stability. For example, in some embodiments the material of the trailer bracket 32 may be ⅛-inch thick steel. In other embodiments, all or part of trailer bracket 32 may be plastic or other synthetic material. The trailer bracket 32 may generally position the trailer connector 36 where it may be mated with the tow vehicle connector 34. In certain embodiments, the trailer bracket 32 may be attached to the tongue 28 by a base 42. The base 42 may be a steel plate that is approximately one foot in length to allow connection with a standard trailer tongue 28.

The base 42 may support a trailer connector plate 38. The trailer connector plate 38 may be generally arc shaped. The arc radius of the trailer connector plate 38 may be generally centered on the hitch pin 48. The trailer connector plate 38 may define a radius from an axial centerline of the hitch pin 48. In certain embodiments, the radius may be between six and eight inches with an approximately 190° angle formed by an imaginary arc having a vertex at the hitch pin and extending to each side of the trailer connector plate 38. The connector plate 38 may extend such that the angle formed with the hitch pin 48 is any suitable angle, and the angle may be 190° or greater. In certain embodiments, the angle is any suitable angle that will allow the trailer 12 to rotate through an angle of at least 180°—plus or minus 90° about the longitudinal axis of the tow vehicle 14.

The trailer connector plate 38 may define a slot 40. The slot 40 may generally follow the arc shape of the trailer connector plate 38. The arc of the trailer connector plate 38 and the slot 40 may allow the trailer connector plate 38 and the attached trailer 12 to rotate (yaw) about the trailer connector 36 when the trailer 12 is towed around a corner or is otherwise subjected to forces that cause it to pivot relative to the tow vehicle 14. The slot 40 may constrain the motion of the trailer connector 36 while maintaining the freedom to allow the trailer connector plate 38 to rotate about the trailer connector 36 when the trailer 12 turns behind the tow vehicle 14.

The slot 40 may define a curvilinear path in which the trailer connector 36 may be free to move. In certain embodiments, the slot 40 may extend sufficiently to allow the trailer 12 to rotate through an angle of approximately 180° (+ or −90°) with respect to the tow vehicle 14. Accordingly, the slot 40 may form an approximately 180° or any suitable greater angle having a vertex aligned with the hitch pin 48. The rotational limits of the slot 40 may not serve to limit the rotational motion of the trailer 12, as the forces involved in rotating the trailer may be too great to be adequately opposed by the rotational limits of the slot 40. That is, if a jackknife situation occurs, the rotational motion of the trailer 12 causing the connectors to forcefully encounter the rotational limit of the slot 40 will likely cause the connectors to disconnect.

In certain embodiments, the slot 40 may be approximately three-fourths of an inch wide. This width may be particularly suitable to accommodate a conventional electrical connector of the trailer 12. The height of the trailer connector plate 38 may be any suitable height, but the trailer connector plate 38 may be short enough to allow clearance of an overhang of the trailer 12. In certain embodiments, the trailer connector plate 38 may be approximately four inches in height, with approximately two inches or more of the trailer connector plate 38 extending above the slot 40 to allow for the structural strength of the connector plate 38.

The trailer connector plate 38 may be hinged to the base 42. The hinge 46 may allow the angle between the trailer connector plate 38 and the tongue 28 to be manually adjusted. This adjustability may accommodate tongues 28 that may extend from the trailer 12 at a variety of different angles. In certain embodiments, the hinge 46 may allow the trailer connector plate 38 to keep the trailer connector 36 substantially parallel to the bed 16 of the tow vehicle 14 to allow proper mating with tow vehicle connector 34 and proper rotation of the trailer 12 when it turns behind the tow vehicle 14.

Figure 3:
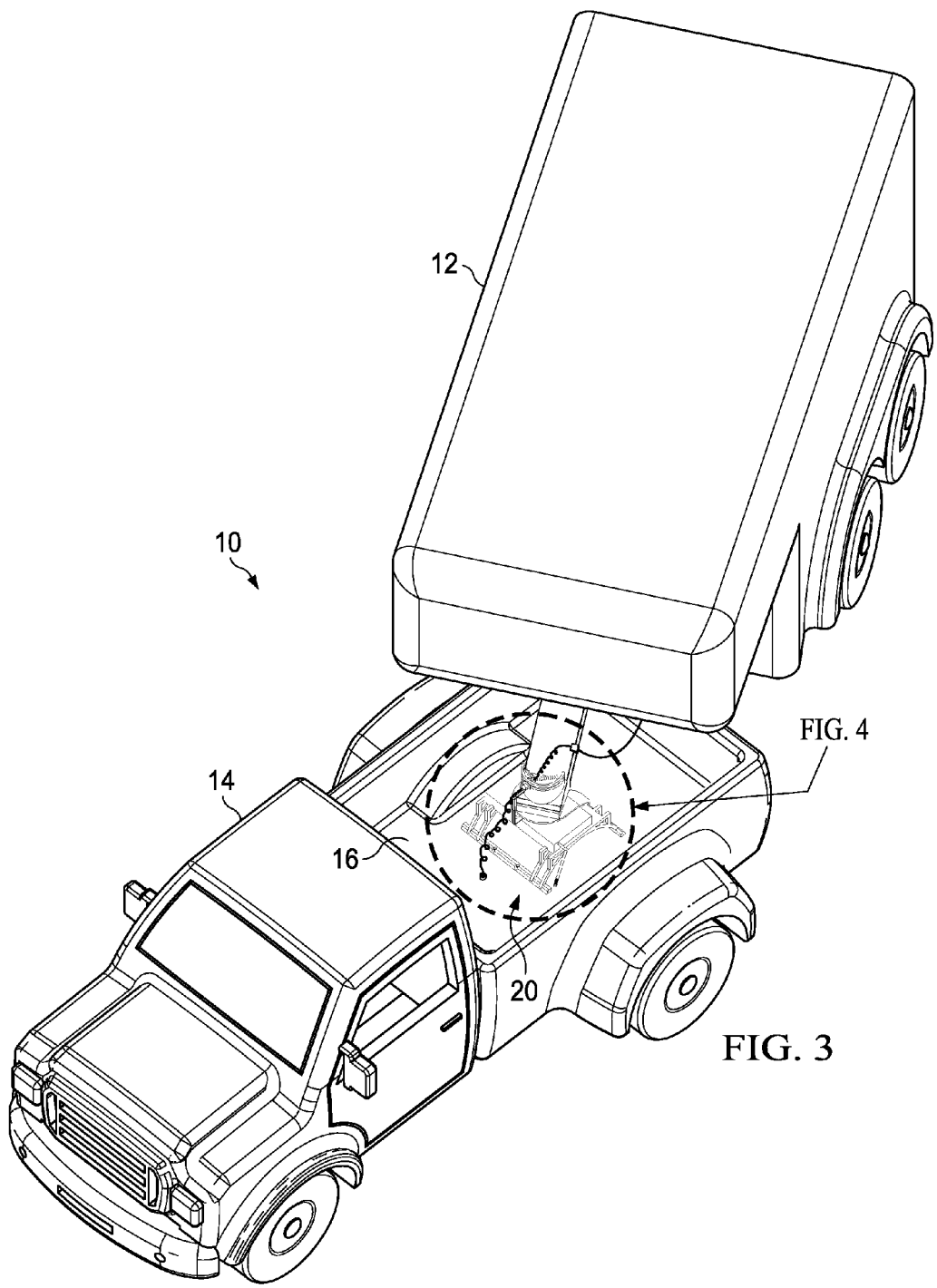
FIG. 3 is a perspective view of the fifth wheel trailer hitch system shown in FIG. 1 showing the trailer pivoted with respect to the tow vehicle according to an embodiment of the present disclosure.
Figure 4:
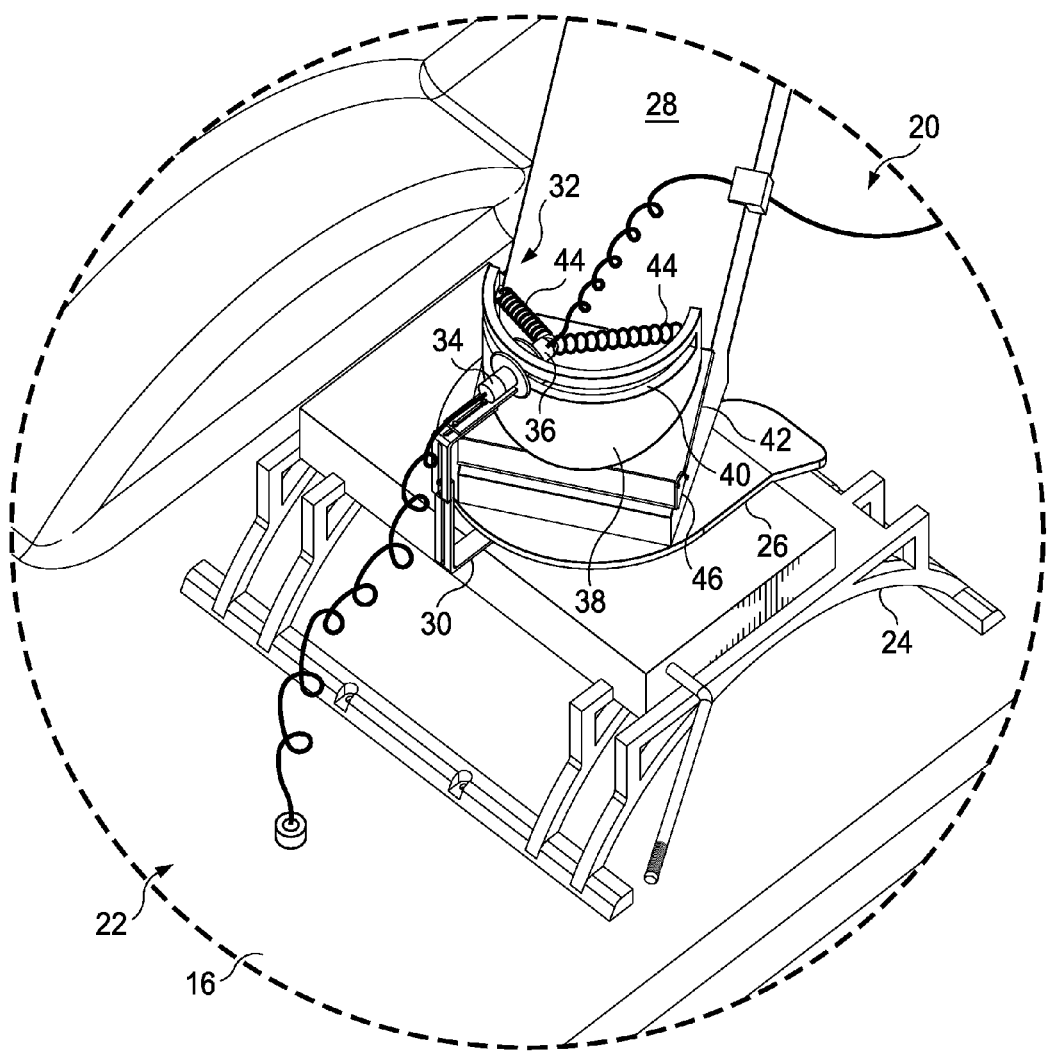
FIG. 4 is a detailed view of the fifth wheel trailer hitch system shown in FIG. 3 according to an embodiment of the present disclosure.

The trailer bracket 32 may also include one or more retention springs 44. A retention spring 44 may have one end coupled to the trailer connector plate 38, and the other end coupled to the trailer connector 36. The retention springs 44 may be any suitable size and strength linear spring. In certain embodiments, the retention springs 44 may have a sufficient spring constant and length to allow the springs 44 to position the trailer connector 36 generally centered in the slot 40 to aid hook-up, while the force applied on the trailer connector 36 may not be great enough to cause the trailer connector 36 to torque and bind when the connectors 36 and 34 are engaged. The retention springs 44 may have a polymer or other suitable synthetic coating. A second retention spring 44 may be similarly configured. Together, the two retention springs 44 may position trailer connector 36 within the slot 40. To accommodate the hitching operation, the retention springs 44 may position the trailer connector 36 in approximately the center of the slot 40. During the towing operation 10, the elasticity of the retention springs 44 may allow motion of the trailer connector with respect to the trailer bracket 32 constrained by the slot 40. As illustrated in FIGS. 3 and 4, the trailer 12 may rotate with respect to the tow vehicle 14. FIG. 4 illustrates a rightward rotation of the trailer 12. Rotation in this direction may cause the right retention spring 44 to be relaxed, while the left retention spring 44 is stressed. During a leftward rotation of the trailer 12, the opposite may occur.

Figure 5B:
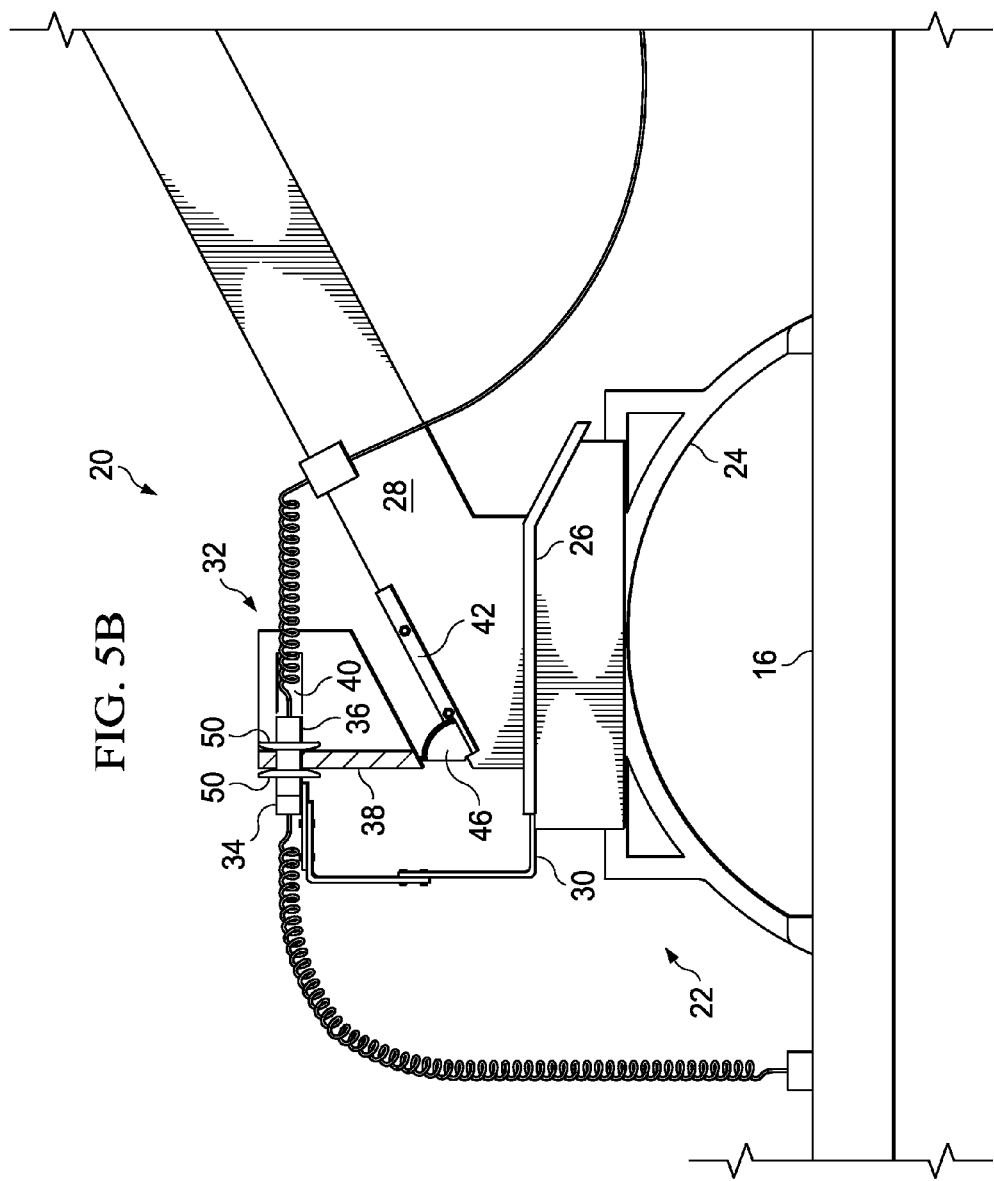
FIG. 5B is an elevation view of the hitched fifth wheel trailer hitch system shown in FIG. 2 according to an embodiment of the present disclosure.

FIGS. 5A and 5B illustrate mating the trailer connector 36 with the tow vehicle connector 34. One or more flanges 50 attached to the trailer connector 36 may assist mating the trailer connector 36 with the tow vehicle connector 34. One flange 50 may be positioned on the inside of the trailer connector plate 38, and another flange 50 may be positioned on the outside of the trailer connector plate 38. Prior to connection, the hitch pin 48 may be aligned with the retaining slot of the skid plate 26. Also, the trailer connector 36 may be aligned with the tow vehicle connector 34. As the tow vehicle 14 is backed toward the trailer 12, the hitch pin may engage with the retaining slot of the skid plate 26. Approximately simultaneously, the tow vehicle connector 34 may be connected to the trailer connector 36. In certain embodiments, the tow vehicle connector 34 may exert a force on the trailer connector 36 in the direction of the motion of the tow vehicle 14. This force may be opposed by the flange 50 on the outside of the trailer connector plate 36. These forces may allow the tow vehicle connector 34 to mate with the trailer connector 36 as the tow vehicle 14 is backed toward the trailer 12.

The flange 50 may also assist in decoupling the trailer connector 36 from the tow vehicle connector 34. The flange 50 on the inside of the trailer connector plate 38 may prevent the trailer connector 36 from moving toward the tow vehicle and cause the tow vehicle connector 34 to disconnect from the trailer connector 36 when the tow vehicle 14 is driven away from the trailer 12. A spring force from a spring mechanism integral to the trailer connector 36 and/or tow vehicle connector 34 may keep the connectors engaged.

The trailer connector 36 and the tow vehicle connector 34 may be any suitable multi-conductor connectors. In certain embodiments, the connectors 36 and 34 may be male and female seven-way electrical connectors. In other embodiments, the trailer connector 36 and the tow vehicle connector 34 may be any suitable hydraulic, coolant, or compressed air connectors. In certain embodiments, the conventional trailer electrical connection used to supply power to the trailer 12 may be plugged into a receiver or jumper on the trailer 12, for example on the tongue 28. An electrical cable may run from this connection to the trailer connector 36 according to an embodiment of the present disclosure. In alternate embodiment, a conventional electrical connector may be received by slot 40 and generally become the trailer connector 36.

Another embodiment of a trailer hitch system 60 is illustrated in FIGS. 6-10B. This embodiment of the trailer hitch system 60 may be adaptable to a conventional gooseneck trailer hitch. The teachings of the present disclosure may allow a conventional hitching operation of a gooseneck trailer hitch to substantially simultaneously connect electrical, hydraulic, or compressed air connections of a tow vehicle with corresponding connections of a trailer. FIG. 6 shows an environmental view of a towing operation 52. In the towing operation 52 depicted, a trailer 54 is connected to a tow vehicle 56. FIG. 7 is an enlarged view of the trailer hitch system 60 of FIG. 1 showing its features in more detail.

Figure 10A:
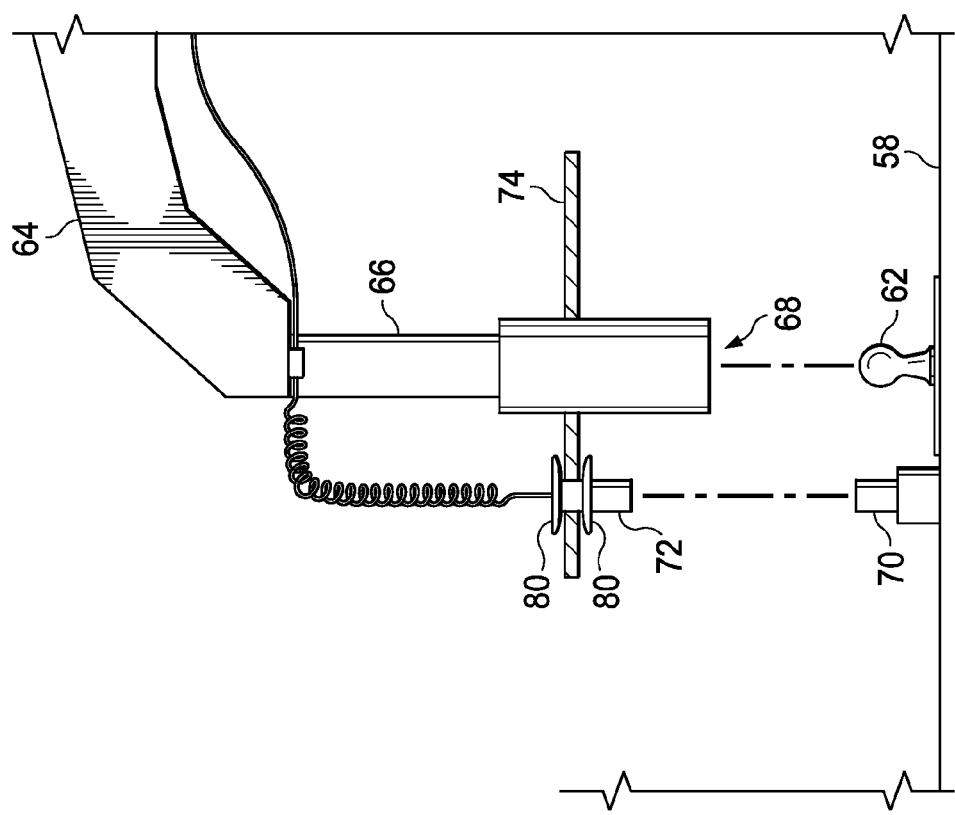
FIG. 10A is an elevation view of the unhitched gooseneck trailer hitch system shown in FIG. 7 according to an embodiment of the present disclosure.

The trailer hitch system 60 may include a ball 62 that may be mounted in the middle of a bed 58 of the tow vehicle 56 (see FIG. 10A). The ball 62 may be sized to fit within a socket 68 when the trailer 54 is hitched to the tow vehicle 56. A locking mechanism may be pulled under the ball by a lever. Safety chains may be used to ensure that if the ball 62 and the socket 68 become unintentionally disconnected, the trailer 54 will not completely separate from the tow vehicle 56. The ball 62 and socket 68 mounting configuration may allow the trailer sufficient freedom to pivot with respect to the trailer 54 during the towing operation 52.

According to an embodiment of the present disclosure, a tow vehicle connector 70 may be generally fixed to the bed 58 of the tow vehicle 56 proximate the ball 62. The tow vehicle connector 70 may be generally rigidly mounted to the bed 58 of the tow vehicle 56. In other embodiments, a bracket or other mounting feature may be used to mount the tow vehicle connector 70 to the bed 58. The tow vehicle connector 70 may be positioned to allow it to be connected to a trailer connector 72 when the trailer 54 is connected to the tow vehicle 56. The tow vehicle connector 70 may allow power for lighting and breaking to be transmitted from the tow vehicle 56 to the trailer 54.

In certain embodiments, the tow vehicle connector 70 may be a hydraulic, coolant, or compressed air connection. The tow vehicle connector 70 may be adjustable vertically and horizontally to allow manual adjustment of the height of the distance the tow vehicle connector 70 extends from the bed 58 or the distance away from the ball 62. The tow vehicle connector 70 may be similar to a conventional electrical connection found on a vehicles equipped to tow a trailer or other equipment.

On the trailer 54 side of the trailer hitch system 60, there may be a trailer connector 72 and a trailer connector plate 74. The trailer connector plate 74 may be formed from any suitable materials such as ⅛-inch thick aluminum or steel. The trailer connector plate 74 may generally position the trailer connector 72 where it may be mated with the tow vehicle connector 70. In certain embodiments, the trailer connector plate 74 may be welded or otherwise fixed to a downward extending member 66 of the neck 64 of the trailer 56. The trailer connector plate 74 may generally be a circular, disk shape. In certain embodiments, the trailer connector plate 74 may be semi-circular. The teachings of the present disclosure contemplate any suitable shape of the trailer connector plate 74, including, for example, a semicircular shape or other arced shape. The radius of the arc of the trailer connector plate 74 may be generally centered on an axial centerline of the ball 62 when hitched.

The trailer connector plate 74 may define a slot 76. The slot 76 may allow the trailer connector plate 74 and the attached trailer 54 to rotate about the trailer connector 72 when the trailer 54 is towed around a corner or is otherwise subjected to forces that cause it to pivot relative to the tow vehicle 56. The slot 76 may generally follow the arc shape of the trailer connector plate 74 and its radius may also be centered on an axial centerline of the ball 68. The slot 76 may constrain the motion of the trailer connector 72 while maintaining the freedom to allow the trailer connector plate 74 to rotate about the trailer connector 72 when the trailer 54 turns behind the tow vehicle 56.

The slot 76 may define a curvilinear path in which the trailer connector 72 may be free to move. In certain embodiments, the slot 76 may extend sufficiently to allow the trailer 54 to rotate through an angle of approximately 180° (+ or −90°) with respect to the tow vehicle 56. Accordingly, the slot 76 may form an approximately 180° or any suitable greater angle having a vertex aligned with the ball 62. Similar to the fifth wheel hitch embodiment, the rotational limits of the slot 76 may not serve to limit the rotational motion of the trailer 12. Rather, the slot 76 may extend sufficiently to allow at least a 90° rotation of the trailer 54 about either side of the tow vehicle 56 in the event of a jackknife situation.

In certain embodiments, the slot 76 may be approximately three-fourths of an inch wide. This length may be particularly suitable to accommodate a conventional electrical connector of the trailer 54. The trailer connector plate 74 may be substantially parallel to the bed 58 of the tow vehicle 56 to allow proper mating with tow vehicle connector 70.

The trailer connector 72 may be generally positioned by one or more retention springs 78. A retention spring 78 may have one end coupled to the trailer connector plate 74 and the other end coupled to the trailer connector 72. The retention springs 78 may be substantially similar to the retention springs 44 described with respect to FIGS. 1-5B. A second retention spring 78 may be similarly configured. Together, the two retention springs 78 may position trailer connector 72 within the slot 76. To accommodate the hitching operation, the retention springs 78 may position the trailer connector 72 in approximately the center, or null position, of the slot 40. During the towing operation 52, the elasticity of the retention springs 78 may allow motion of the trailer connector 72 with respect to the trailer connector plate 74 constrained by the slot 76. As illustrated in FIGS. 8 and 9, the trailer 54 may rotate on a generally horizontal plane with respect to the tow vehicle 56. This may be referred to as a yaw motion. FIG. 8 illustrates that if the trailer 54 rotates right of the tow vehicle 56, the right retention spring 78 is relaxed, while the left retention spring 78 is stressed. During a leftward rotation of the trailer 54 with respect to the tow vehicle 56, the opposite may occur.

Figure 10B:
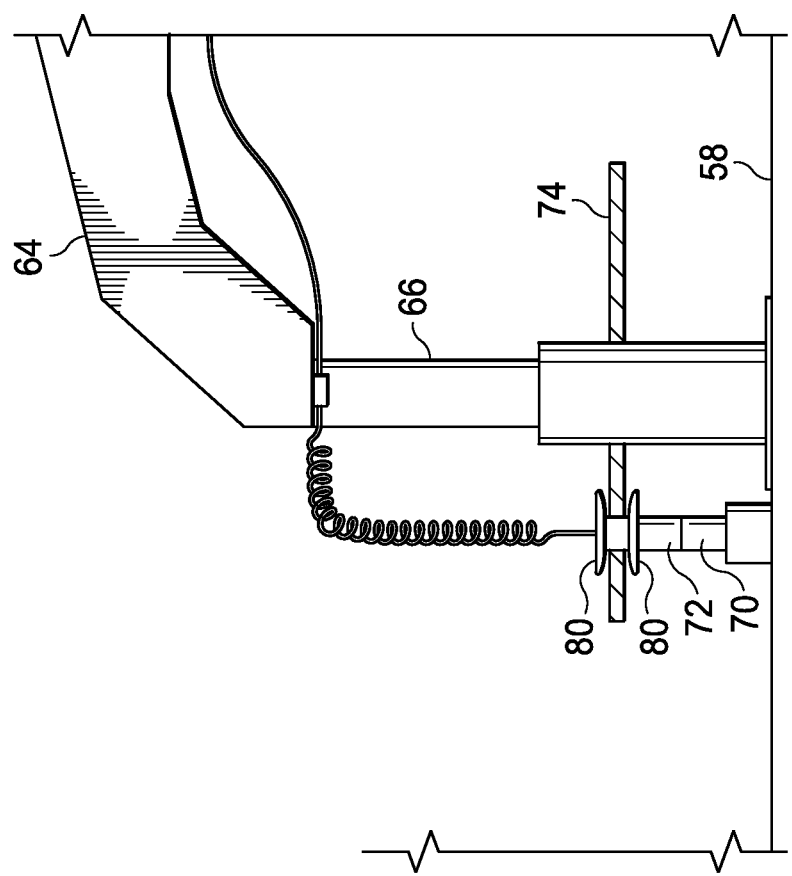
FIG. 10B is an elevation view of the hitched gooseneck trailer hitch system shown in FIG. 7 according to an embodiment of the present disclosure.

FIGS. 10A and 10B illustrate the mating of the trailer connector 72 with the tow vehicle connector 74. One or more flanges 80 may assist mating the trailer connector 72 with the tow vehicle connector 74. One flange 80 may be positioned on a top side of the trailer connector plate 74, and another flange 80 may be positioned on the bottom side of the trailer connector plate 74. Prior to connection, the ball 62 and the socket 68 may be aligned. Also, the trailer connector 72 may be vertically aligned with the tow vehicle connector 70. As the neck 64 of trailer 54 is lowered toward the ball 62 of the tow vehicle 56, the ball 62 may fit into the socket 68. Approximately simultaneously, the tow vehicle connector 70 may be connected to the trailer connector 72. In certain embodiments, the tow vehicle connector 70 may exert a force on the trailer 72 opposite the direction of motion of the trailer connector 72. The flange 80 on the bottom side of the trailer connector plate 74 may oppose this force. These forces may allow the tow vehicle connector 70 to mate with the trailer connector 72 as the trailer 54 is lowered toward the tow vehicle 56. Similar to the fifth wheel embodiments, an internal spring force may maintain the connection.

The flange 80 may also assist in decoupling the trailer connector 72 from the tow vehicle connector 70. The trailer connector plate 74 may exert a force on the flange 80 on the top side of the trailer connector plate 74 and cause the tow vehicle connector 70 to disconnect from the trailer connector 72 as the trailer 54 is raised away from the tow vehicle 56.

The trailer connector 72 and the tow vehicle connector 70 may be any suitable multi-conductor connectors. In certain embodiments, the connectors 72 and 70 may be male and female seven-way electrical connectors. In other embodiments, the trailer connector 72 and the tow vehicle connector 70 may be any suitable hydraulic, coolant, or compressed air connectors. In certain embodiments, the conventional trailer electrical connection used to supply power to the trailer 54 may be plugged into a receiver or jumper located on the trailer 54, for example on the neck 64. An electrical cable may run from this connection to the trailer connector 72 according to an embodiment of the present disclosure. In alternate embodiment, a conventional electrical connector may be received by slot 76 and generally become the trailer connector 72.

Figure 12:
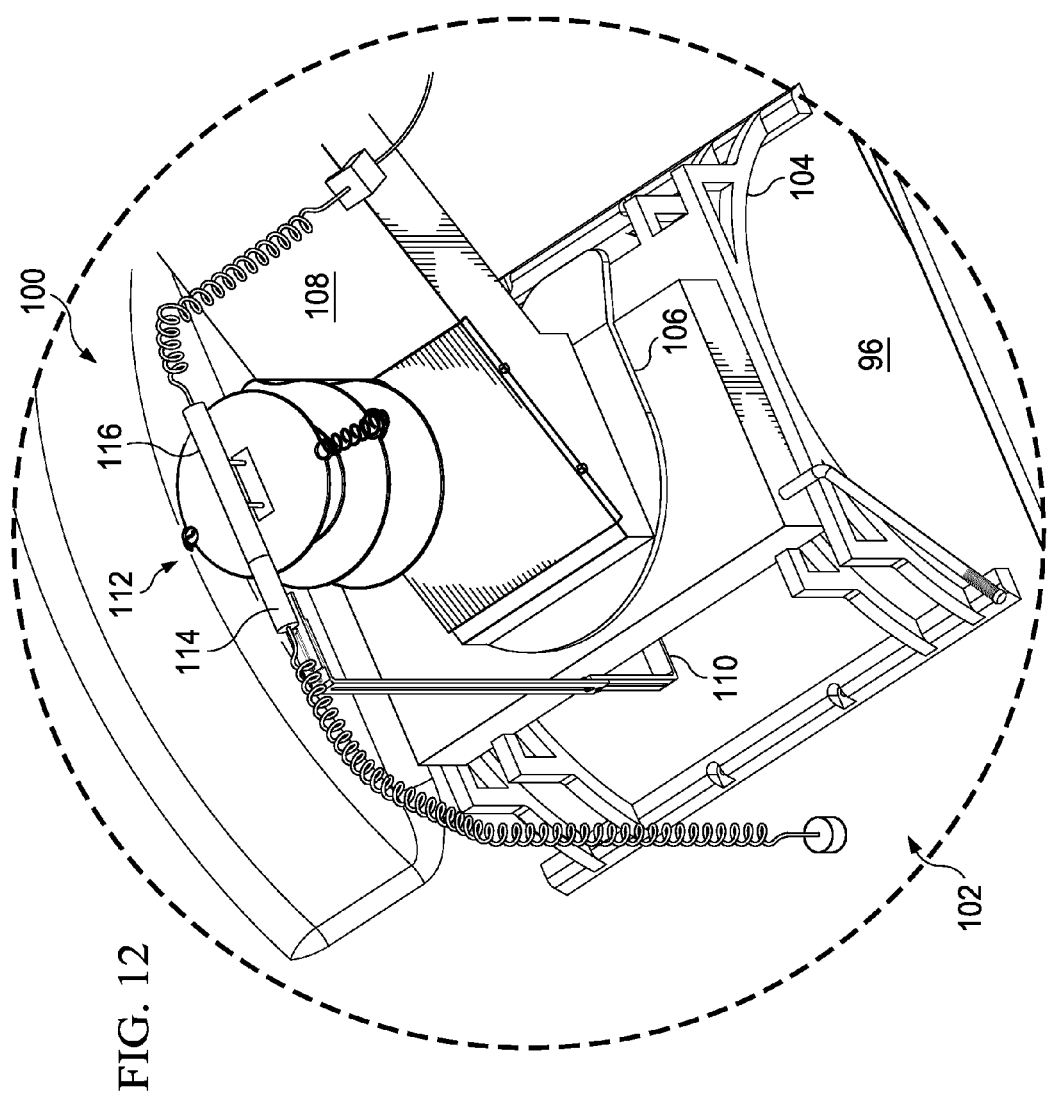
FIG. 12 is a detailed view of the fifth wheel trailer hitch system shown in FIG. 11 according to the present disclosure.

FIGS. 11-15B illustrate a further embodiment of the present disclosure. The embodiment of the trailer hitch system 100 shown in FIGS. 11-15B may be similar to the fifth wheel trailer hitch embodiment shown in FIGS. 1-5B in that the trailer system 100 may be similarly adaptable to a conventional fifth-wheel trailer hitch. As such, the teachings of the present disclosure may allow a conventional hitching operation of a fifth-wheel trailer hitch to substantially simultaneously connect electrical, hydraulic, coolant, or compressed air connections of a tow vehicle with electrical or hydraulic connections of a trailer. In the towing operation 90 depicted in FIG. 11, a trailer 92 is connected to a tow vehicle 94 using a fifth-wheel trailer hitch according to an embodiment of the present disclosure. FIG. 12 is an enlarged view of the trailer hitch 100 of FIG. 11 showing its features in more detail.

The trailer hitch system 100 may include a hitch receiver 102 that may be mounted in a bed 96 of the tow vehicle 94. The hitch receiver 102 may include a hitch frame 104 that supports a skid plate 106. The skid plate 106 defines a pin-receiving slot configured to receive a hitch pin 128 of the trailer 92 (see FIG. 15A). The hitch pin 128 may extend from a tongue 108 of the trailer 92. The trailer 92 and the tow vehicle 94 may couple in the conventional manner, and the electrical, hydraulic, coolant, or compressed air connections may couple according to embodiments of the present disclosure.

A tow vehicle bracket 110 may be attached to the hitch receiver 102 similarly to the embodiment of FIGS. 1-5B, where the tow vehicle bracket 110 may be attached such that it is fixed with respect to the skid plate 106. The tow vehicle bracket 110 may support and position a tow vehicle connector 114 where it may be connected to a trailer connector 116 when the trailer 92 is connected to the tow vehicle 94. The tow vehicle connector 114 may allow power for lighting and breaking to be transmitted from the tow vehicle 94 to the trailer 92. Similarly to the previously described fifth wheel embodiment, the tow vehicle connector 114 may be adjustable vertically and horizontally to allow manual adjustment of the height and depth of the tow vehicle connector 114.

On the trailer 92 side of the trailer hitch system 100, there may be a trailer connector 116 generally positioned by a trailer bracket 112. The trailer bracket 112 may generally position the trailer connector 116 where it may be mated with the tow vehicle connector 114. Similar to the other fifth wheel embodiment, the trailer bracket 112 may be attached to the tongue 108 by a base 122. The base 122 may be a steel or aluminum plate that is sized to connect with a standard trailer tongue 108.

Figure 15A:
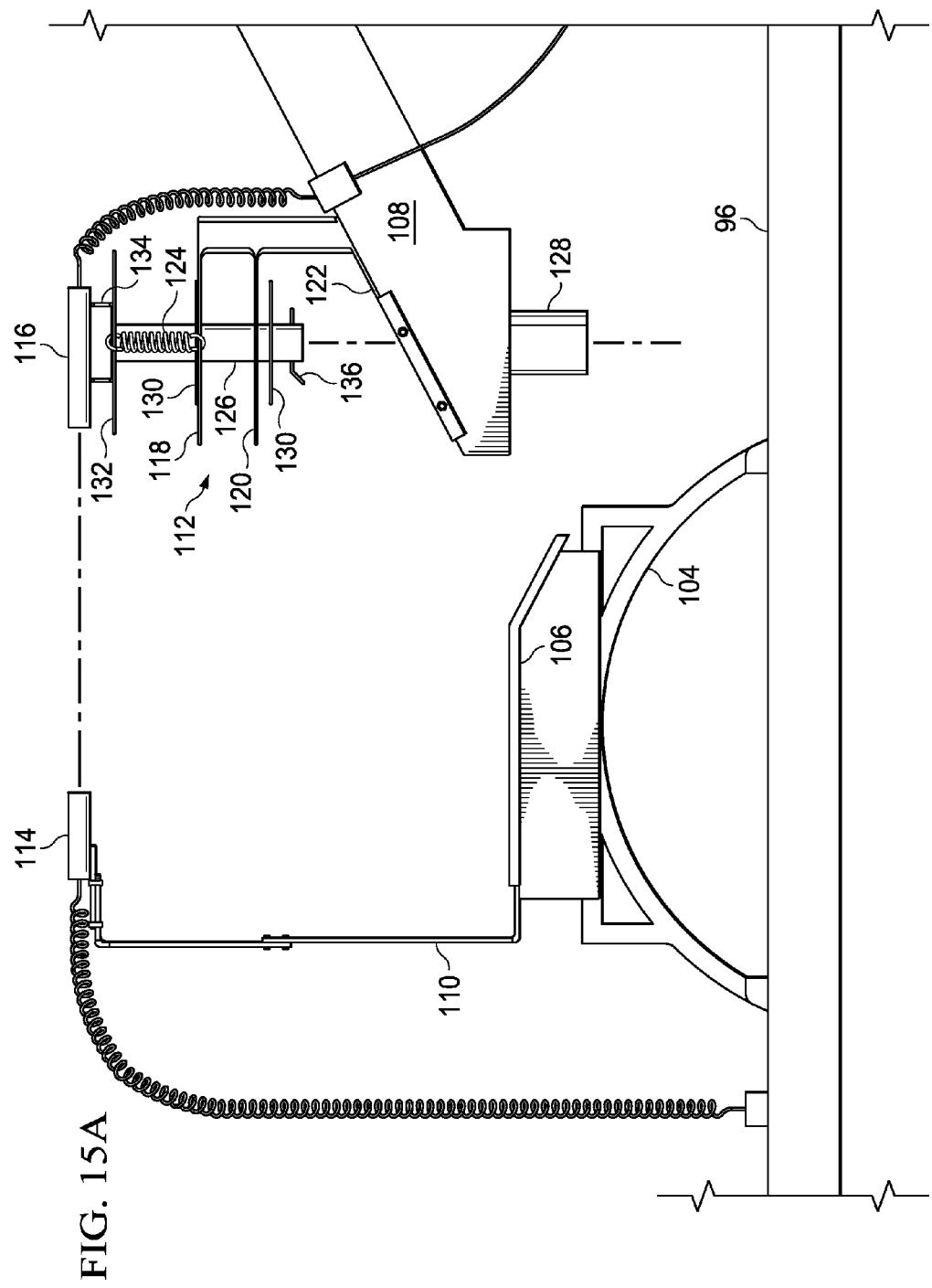
FIG. 15A is an elevation view of the unhitched fifth wheel trailer hitch system shown in FIG. 12 according to an embodiment of the present disclosure.

As shown in FIGS. 11-15B, and particularly FIGS. 15A and B, components of the trailer bracket 112 are illustrated. The trailer connector 116 may be supported by a connector support 134. The connector support 134 may be adjustable horizontally to allow for manual adjustability, so the trailer bracket 112 may be adaptable to different types and sizes of fifth wheel trailer hitches. The connector support 134 may be fixed to a platform 132, which may be fixed to a rod 126. The rod 126 may be received through an upper and lower plate 118 and 120. There may be clearance between the rod 126 and the upper and lower plates 118 and 120 to allow the upper and lower plates 118 and 120 to rotate with respect to the rod 126. In certain embodiments, an axial centerline of the rod 126 may generally be aligned with an axial centerline of the hitch pin 128. This alignment may allow the trailer 92 to rotate unhindered with respect to the rod 126 without binding.

Each of the upper and lower plates 118 and 120 may be fixed to the base 122, which may be fixed to the tongue 108. Thus, when the trailer 92 turns behind the tow vehicle 94, the upper and lower plates 118 and 120 may rotate with the trailer 92, while the rod 126, the platform 132, the connector support 134, and the trailer connector 116 remain generally fixed with respect to the rotation of the trailer 92.

The trailer bracket 112 may also include one or more retention springs 124. A retention spring 124 may have one end coupled to the platform 132, and the other end coupled to the upper plate 118. The retention spring 124 may be received through an eyehole in both the platform 132 and the upper plate 118. The retention springs 124 may be substantially similar to retention springs 44 described with respect to FIGS. 1-5B. A second retention spring 124 may be similarly configured. Together, the two retention springs 124 may position trailer connector 116 generally aligned with the tow vehicle connector 114. The retention springs 124 may be positioned generally vertically on each side of the trailer hitch system 100 such that a horizontal imaginary line between the two retention springs 124 may be perpendicular to the direction of travel.

To accommodate the hitching operation, the retention springs 124 may position the trailer connector 116 generally aligned with the trailer 92 and the tow vehicle 94. During the towing operation 90, the elasticity of the retention springs 124 may allow motion of the trailer connector 116 with respect to the upper and lower plates 118 and 120. The rotational motion of the trailer connector 116 may be generally unconstrained according to this embodiment.

As illustrated in FIGS. 13 and 14, the trailer 92 may rotate with respect to the tow vehicle 94. FIG. 14 illustrates a rightward rotation of the trailer 92. Rotation in this direction may cause the retention springs 124 to be stressed as the upper plate 118 rotates counterclockwise with the trailer 92. Thus, the bottom portion of the retention springs 124 rotate away from the top portion, which may be held in position by their connection to the platform 132, as illustrated in FIGS. 13 and 14. During a leftward rotation of the trailer 92 with respect to the tow vehicle 94, the upper plate 118 may rotate clockwise with respect to the platform 132.

The trailer connector 116 and the tow vehicle connector 114 may be any suitable multi-conductor connector, such as male and female seven-way electrical connectors. In other embodiments, the trailer connector 116 and the tow vehicle connector 114 may be any suitable hydraulic, coolant, or compressed air connector. In certain embodiments, the conventional trailer electrical connection used to supply power to the trailer 92 may be plugged into a receiver or jumper located on the trailer 92, for example on the tongue 108. An electrical cable may run from this connection to the trailer connector 116 according to an embodiment of the present disclosure. In alternate embodiment, a conventional electrical trailer connector may be supported by connector support 134 and generally become the trailer connector 116.

The trailer bracket 112 may include washers 130. The washers 130 may be generally secured to the rod 126 with a friction fit. The washers 130 may serve to position the rod 126 in a particular vertical position or height above the tongue 108. The washers 130 may also allow vertical adjustability of the rod 126. The washers 130 may be generally smaller in diameter than the upper and lower plates 118 and 120, particularly the upper plate 118. This dimensional difference may allow the washer 130 to perform its function of vertically retaining the rod 126 and still allow the upper plate 118 to perform its function of providing a surface that is independent of the rod 126 for the retention springs 124 to connect. The upper washer 130 may secure a minimum height of the rod 126, while the lower washer 130 may secure a maximum height of the rod 126 with respect to the upper and lower plates 118 and 120. A removable carter key 136 that may fit through an aperture in the rod 126 may substantially hold the trailer bracket together. The overall height of the trailer bracket 112 may be low enough to allow an overhang of the trailer 92 to clear the trailer bracket 112. In certain embodiments, the trailer bracket 112 may be approximately five to six inches or any other suitable height above the tongue 108. The rod 126 may clear the tongue 108 by approximately ½ inch in certain embodiments. The vertical distance between the upper plate 118 and the lower plate 120 may be any suitable distance. Furthermore, the trailer bracket 120 may position the rod 126 directly over the hitch pin 128, as depicted in FIG. 15A.

FIGS. 15A and 15B illustrate the mating the trailer connector 116 with the tow vehicle connector 114. Prior to connection, the hitch pin 128 may be aligned with the retaining slot of the skid plate 106. Also, the trailer connector 116 may be aligned with the tow vehicle connector 114. As the tow vehicle 94 is backed toward the trailer 92, the hitch pin 128 may engage with the retaining slot of the skid plate 106. Approximately simultaneously, the tow vehicle connector 114 may be connected to the trailer connector 116. In certain embodiments, forces on the connectors 114 and 116 generated by backing the tow vehicle 94 toward the trailer 96 may allow the tow vehicle connector 114 to mate with the trailer connector 116.

Figure 17:
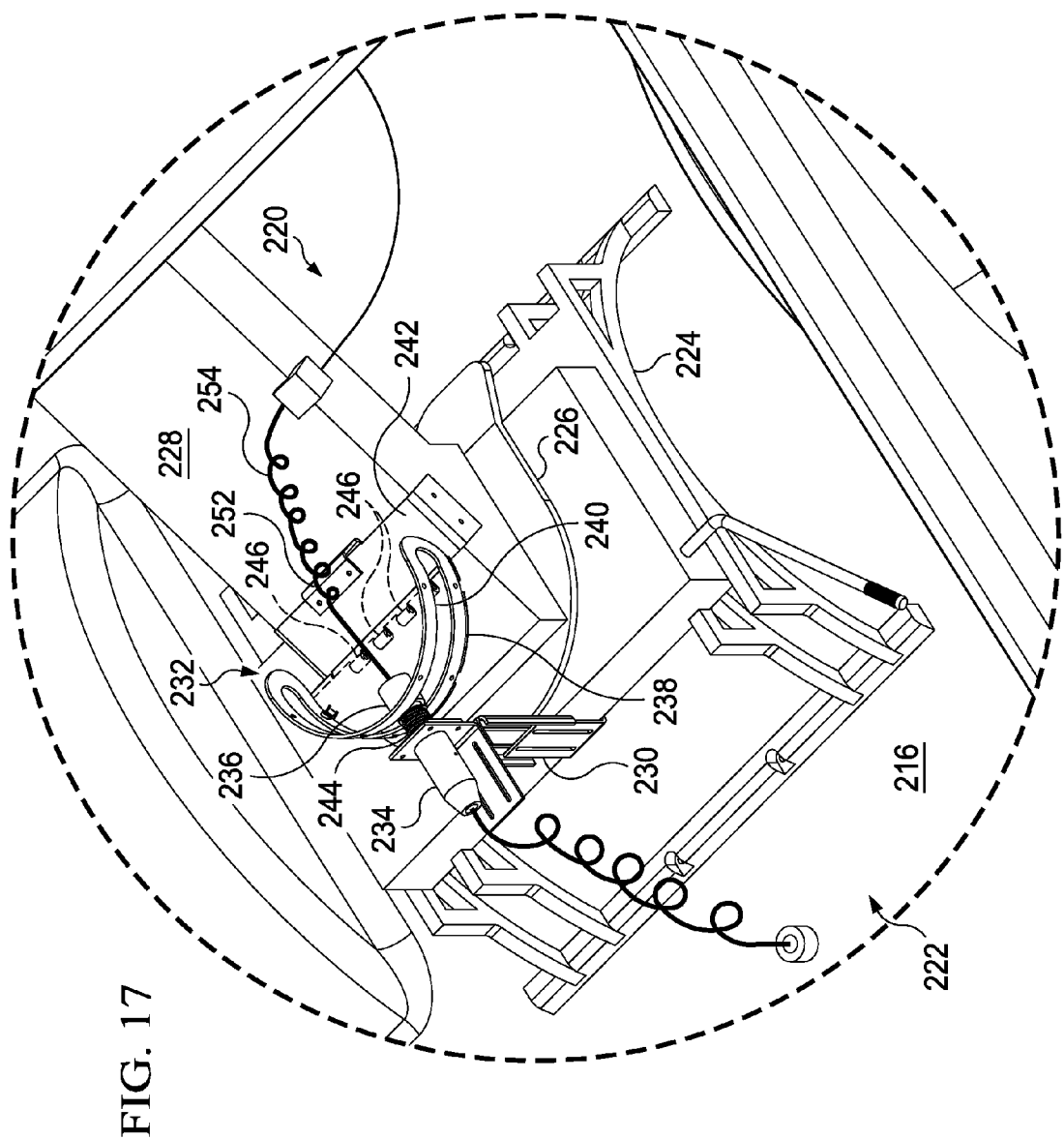
FIG. 17 is a detailed view of the fifth wheel trailer hitch system shown in FIG. 16 according to an embodiment of the present disclosure.

FIGS. 16-20B illustrate a further embodiment of the present disclosure. The embodiment of the trailer hitch system 200 shown in FIGS. 16-20B may be similar to the fifth wheel trailer hitch embodiments shown in FIGS. 1-5B and in FIGS. 11-15B in that the trailer hitch system 200 may be similarly adaptable to a conventional fifth-wheel trailer hitch. As such, the teachings of the present disclosure may allow a conventional hitching operation of a fifth-wheel trailer hitch to substantially simultaneously connect electrical, hydraulic, compressed air, or coolant connections of a tow vehicle with corresponding connections of a trailer. FIG. 16 shows an environmental view of a towing operation 210. In the towing operation 210 depicted, a trailer 212 is connected to a tow vehicle 214 using a fifth-wheel trailer hitch modified according to an embodiment of the present disclosure. FIG. 17 is an enlarged view of the trailer hitch system 220 of FIG. 16 showing its features in more detail.

The trailer hitch system 220 may include a hitch receiver 222 that may be mounted in a bed 216 of the tow vehicle 214. The hitch receiver 222 may include a hitch frame 224 that supports a skid plate 226. The skid plate 226 defines a pin receiving slot configured to receive a hitch pin 248 of the trailer 212 (see FIG. 20A). The hitch pin 248 may also be referred to as a hitch post, a king pin, a tow pin, and the like. The hitch pin 248 may extend from a tongue 228, or pin box, of the trailer 212. The tongue 228, or pin box, may comprise any structure operable to support or retain the hitch pin 248. When coupling the trailer 212 to the tow vehicle 214, the hitch pin 248 may be guided into the pin receiving slot by the sloped entry portion of the skid plate 226. Once engaged in the receiving slot, two spring loaded locking arms capture the hitch pin 248 and retain it. In certain embodiments, a locking bar may be inserted in the hitch receiver to further prevent the locking arms from opening and releasing the hitch pin 248.

According to an embodiment of the present disclosure, a tow vehicle bracket 230 may be attached to the hitch receiver 222 of the tow vehicle 214. The tow vehicle bracket 230 may be attached to the skid plate 226 as shown in FIG. 17. In certain embodiments, the tow vehicle bracket 230 may be attached such that it is fixed with respect to the skid plate 226. Fixing the tow vehicle bracket 230 with respect to the skid plate 226 may allow the hitch receiver 222 to accommodate roll and pitch motions of the trailer 212. The tow vehicle bracket 230 may position a tow vehicle connector 234 where it may be connected to a trailer connector 236 when the trailer 212 is connected to the tow vehicle 214. The tow vehicle connector 234 may allow power for lighting and breaking to be transmitted from the tow vehicle 214 to the trailer 212. In certain embodiments, the tow vehicle connector 234 may be a hydraulic, compressed air, or coolant connection. The tow vehicle connector 234 may be adjustable vertically and horizontally to allow manual adjustment of the height and depth of the tow vehicle connector 234. This adjustability may be accomplished with the slot illustrated in the tow vehicle bracket 230. The tow vehicle bracket 230 may hold the tow vehicle connector 234 substantially fixed relative to the components of a trailer hitch system 220.

On the trailer 212 side of the trailer hitch system 220, there may be a trailer connector 236 generally positioned by a trailer bracket 232. The trailer bracket 232 may generally be formed from aluminum, steel, or other metal. The material of the trailer bracket 232 may be any suitable thickness that allows for structural stability. For example, in some embodiments the material of the trailer bracket 232 may be ⅛-inch thick aluminum or steel. In other embodiments, all or part of the trailer bracket 232 may be plastic or other synthetic material. The trailer bracket 232 may generally position the trailer connector 236 where it may be mated with the tow vehicle connector 234. In certain embodiments, the trailer bracket 232 may be attached to the tongue 228 by a base 242. The base 242 may be a steel plate that is approximately one foot in length to allow connection with a standard trailer tongue 228. In certain embodiments, a cable support bracket 252 may be coupled to the base 242 to support a cable 254 connected to the trailer connector 236. Without such support, the weight of the cable 254 may generate a downward force on the back of the trailer connector 236 sufficient to angle the connector 236 within the slot 240 of the trailer bracket 232 and inhibit movement.

The base 242 may support a trailer connector plate 238. The trailer connector plate 238 may be generally arc shaped. The arc radius of the trailer connector plate 238 may be generally centered on an axial centerline of the hitch pin 248. The trailer connector plate 238 may define a radius from the axial centerline of the hitch pin 248. In certain embodiments, the radius may be defined by an approximately 190° angle formed by an imaginary arc having a vertex at the hitch pin 248 and extending to each side of the trailer connector plate 238. The trailer connector plate 238 may extend such that the angle formed with the hitch pin 248 is any suitable angle, and the angle may be 190° or greater. In certain embodiments, the angle is any suitable angle that will allow the trailer 212 to rotate through an angle of at least 180°, plus or minus 90°, about the longitudinal axis of the tow vehicle 214.

The trailer connector plate 238 may define a slot 240. The slot 240 may generally follow the arc shape of the trailer connector plate 238. The arc of the trailer connector plate 238 and the slot 40 may allow the trailer connector plate 238 and the attached trailer 212 to rotate (yaw) about the trailer connector 236 when the trailer 212 is towed around a corner or is otherwise subjected to forces that cause it to pivot relative to the tow vehicle 214. The slot 240 may constrain the motion of the trailer connector 236 while maintaining the freedom to allow the trailer connector plate 238 to rotate about the trailer connector 236 when the trailer 212 turns behind the tow vehicle 214.

The slot 240 may define a curvilinear path in which the trailer connector 236 may be free to move. In certain embodiments, the slot 240 may extend sufficiently to allow the trailer 212 to rotate through an angle of approximately 180°, plus or minus 90°, with respect to the tow vehicle 214. Accordingly, the slot 240 may form an approximately 180° or any suitable greater angle having a vertex aligned with the axial centerline of the hitch pin 248. The rotational limits of the slot 240 may not serve to limit the rotational motion of the trailer 212, as the forces involved in rotating the trailer 212 may be too great to be adequately opposed by the rotational limits of the slot 240. That is, if a jackknife situation occurs, the rotational motion of the trailer 212 causing the connectors 234, 236 to forcefully encounter the rotational limit of the slot 240 will likely cause the connectors 234, 236 to disconnect.

In certain embodiments, the slot 240 may be approximately three-fourths of an inch wide. This width may be particularly suitable to accommodate any suitable connector or connector backshell of the trailer 212. The height of the trailer connector plate 238 may be any suitable height, but the trailer connector plate 238 may be short enough to allow clearance of an overhang of the trailer 212. In certain embodiments, the trailer connector plate 238 may be approximately four inches in height, with approximately two inches or more of the trailer connector plate 238 extending above the slot 240 to allow for the structural strength of the connector plate 238.

The trailer connector plate 238 may be hinged to the base 242. The hinge 246 may allow the angle between the trailer connector plate 238 and the tongue 228 to be manually adjusted. This adjustability may accommodate tongues 228 that may extend from the trailer 212 at a variety of different angles. In certain embodiments, the hinge 246 may allow the trailer connector plate 238 to keep the trailer connector 236 substantially parallel to the bed 216 of the tow vehicle 214 to allow proper mating with tow vehicle connector 234 and proper rotation of the trailer 212 when it turns behind the tow vehicle 214.

Figure 18:
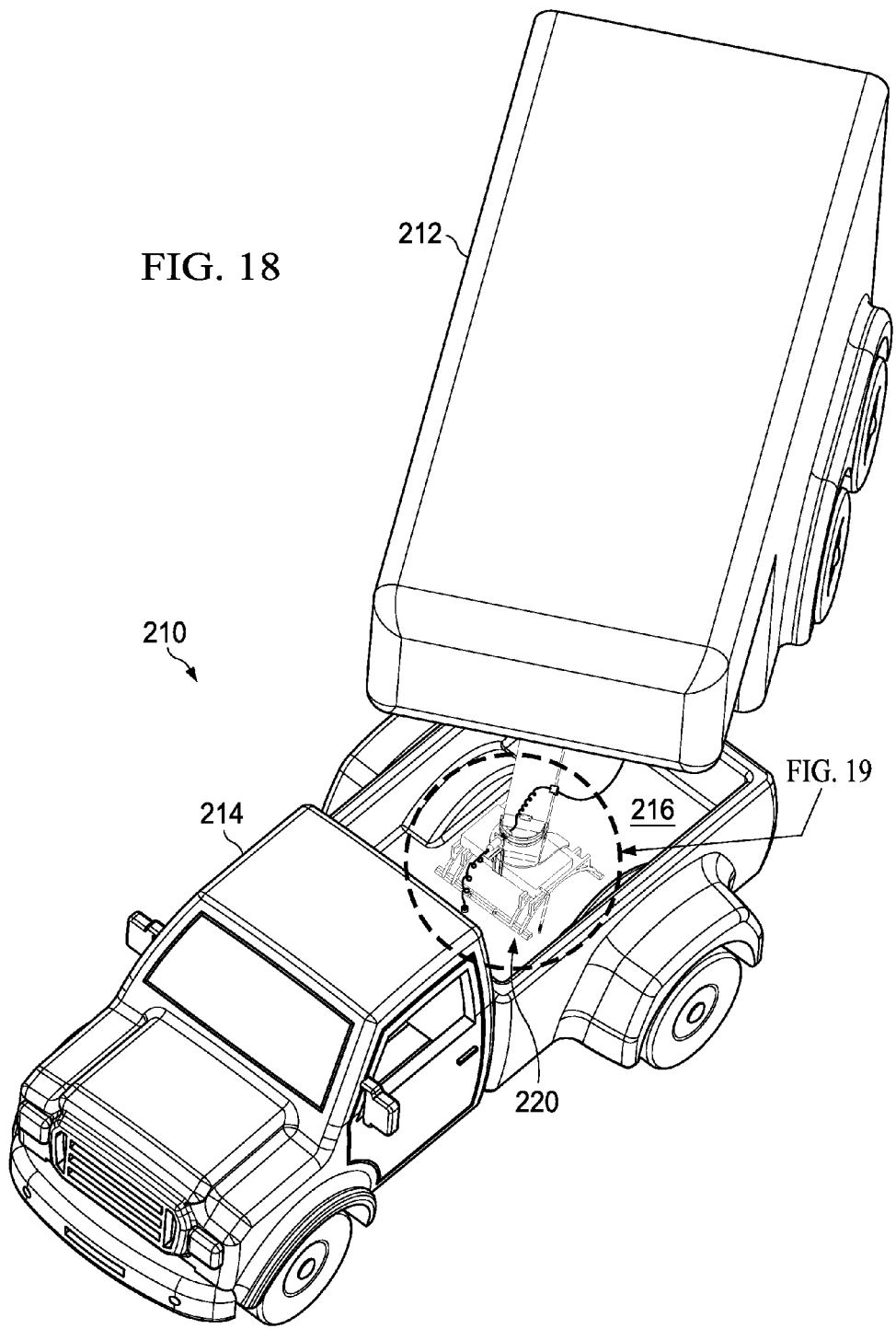
FIG. 18 is a perspective view of the fifth wheel trailer hitch system shown in FIG. 16 showing the trailer pivoted with respect to the tow vehicle according to an embodiment of the present disclosure.
Figure 19:
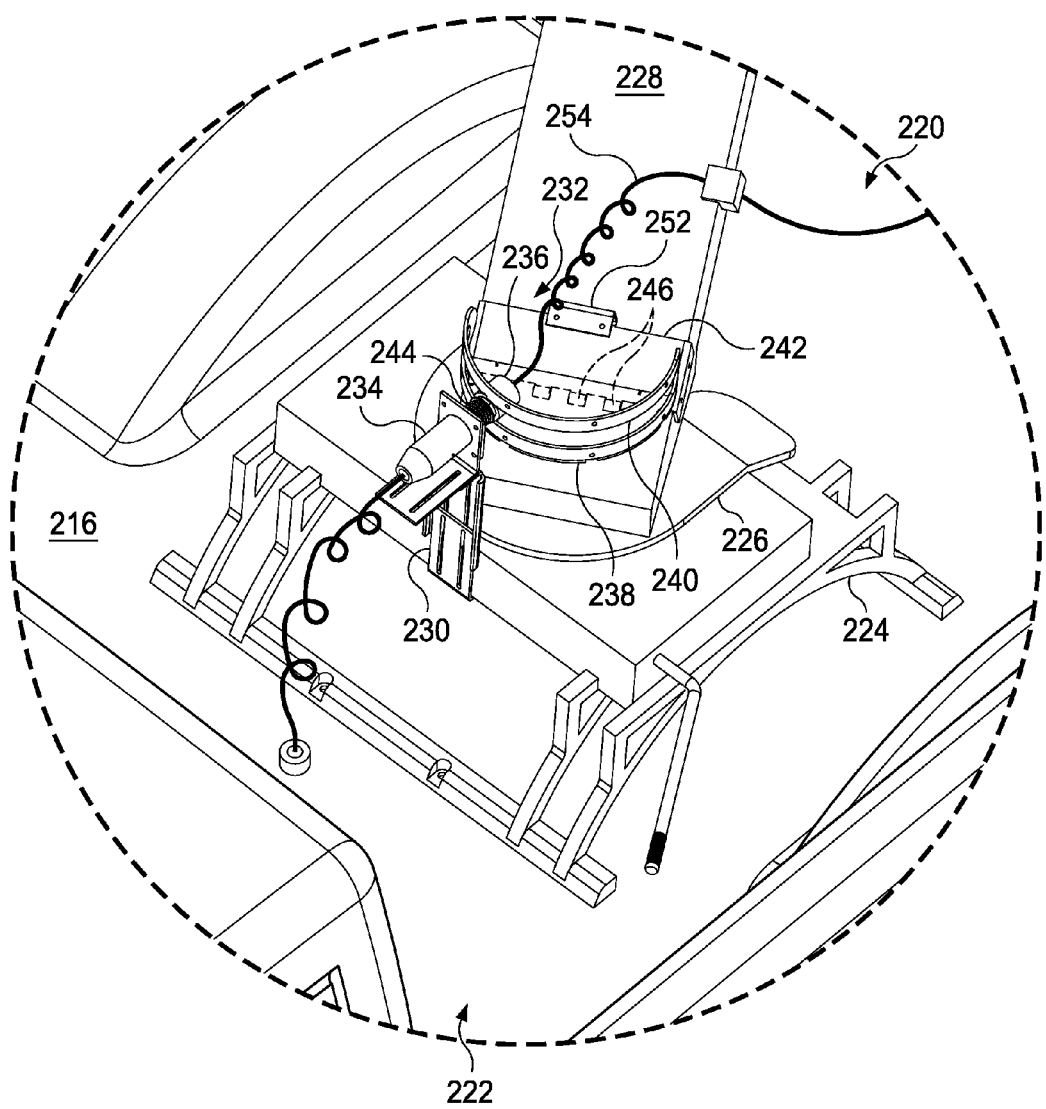
FIG. 19 is a detailed view of the fifth wheel trailer hitch system shown in FIG. 18 according to an embodiment of the present disclosure.

The trailer bracket 232 may also include at least one retention spring 244. The retention spring 244 may be coupled to and disposed around the trailer connector 236. In an embodiment, the retention spring 244 is constrained longitudinally within a recessed area 237 (see FIG. 20A) in the wall of the trailer connector 236. The retention spring 244 may be any suitable size and strength linear spring. In certain embodiments, the retention spring 244 may have a sufficient spring constant to enable positioning the trailer connector 236 to any desired location in the slot 240 and then maintaining the trailer connector 236 in that desired location. The retention spring 244 may have a polymer or other suitable synthetic coating. During the towing operation 210, the elasticity of the retention spring 244 may allow motion of the trailer connector 236 with respect to the trailer bracket 232 constrained by the slot 240. As illustrated in FIGS. 18 and 19, the trailer 212 may rotate with respect to the tow vehicle 214. In an embodiment, the recessed area 237 of the trailer connector 236 may have a slightly flat top and bottom surface such that the diameter of the trailer connector 236 in the recessed area 237 is slightly smaller than the width of the slot 240 within which the trailer connector 236 moves, thereby inhibiting twisting or rotation of the trailer connector 236 within the slot 240.

FIGS. 20A and 20B illustrate mating the trailer connector 236 with the tow vehicle connector 234. One or more optional flanges 250 may be attached to the trailer connector 236 to assist with mating the trailer connector 236 with the tow vehicle connector 234. One flange 250 may be positioned on the inside of the trailer connector plate 238, and another flange 250 may be positioned on the outside of the trailer connector plate 238. The retention spring 244 may engage the flange 250 positioned on the outside of the trailer connector plate 238. In such an embodiment, the flange 250 provides a smooth surface and a larger surface area against which the retention spring 244 exerts force against the trailer connector plate 238.

Prior to connection, the hitch pin 248 may be aligned with the retaining slot of the skid plate 226. Also, the trailer connector 236 may be aligned with the tow vehicle connector 234. In an embodiment, the trailer connector 236 comprises a key 239 designed to engage a key slot 235 on the tow vehicle connector 234 to ensure proper alignment when the two connectors 234, 236 are coupled together. Further, the retention spring 244 on the trailer connector 236 is expanded against the trailer connector plate 238, either directly or via flange 250, to hold the trailer connector 236 in place within the slot 240 of the trailer connector plate 238. Moreover, in the embodiment where the top and bottom surfaces of the recessed area 237 on the trailer connector 236 are slightly flat and the diameter of the recessed area 237 is slightly smaller than the width of the slot 240, the trailer connector 236 is prevented from twisting or rotating within the slot 240 such that the key 239 on the trailer connector 236 remains oriented with the key slot 235 on the tow vehicle connector 234.

As the tow vehicle 214 is backed toward the trailer 212, the hitch pin 248 may engage with the retaining slot of the skid plate 226. Approximately simultaneously, the tow vehicle connector 234 may be connected to the trailer connector 236. In certain embodiments, the tow vehicle connector 234 may exert a force on the trailer connector 236 in the direction of the motion of the tow vehicle 214. This force may be opposed by the flange 250 on the outside of the trailer connector plate 238. These forces may allow the tow vehicle connector 234 to mate with the trailer connector 236 as the tow vehicle 214 is backed toward the trailer 212. Once connectors 234, 236 are mated, the retention spring 244 is at least partially compressed and operates to keep a substantially constant force on the connectors 234, 236 to maintain the connection. The retention spring 244 may further be operable to absorb shock and inhibit rattling between the connectors 234, 236 due to any mechanical clearance therebetween.

The flange 250 may also assist in decoupling the trailer connector 236 from the tow vehicle connector 234. The flange 250 on the inside of the trailer connector plate 238 may prevent the trailer connector 236 from moving toward the tow vehicle 214 and cause the tow vehicle connector 234 to disconnect from the trailer connector 236 when the tow vehicle 214 is driven away from the trailer 212. A spring force from a spring mechanism integral to the trailer connector 236 and/or tow vehicle connector 234 may keep the connectors engaged.

The trailer connector 236 and the tow vehicle connector 234 may be any suitable multi-conductor connectors. In certain embodiments, the connectors 236 and 234 may be male and female seven-way electrical connectors. In other embodiments, the trailer connector 236 and the tow vehicle connector 234 may be any suitable hydraulic, coolant, or compressed air connectors. In certain embodiments, the conventional trailer electrical connection used to supply power to the trailer 212 may be plugged into a receiver or jumper on the trailer 212, for example on the tongue 228. An electrical cable may run from this connection to the trailer connector 236 according to an embodiment of the present disclosure. In alternate embodiment, a conventional electrical connector may be received by slot 240 and generally become the trailer connector 236.

Another embodiment of a trailer hitch system 360 is illustrated in FIGS. 21-25B. This embodiment of the trailer hitch system 360 may be similar to the gooseneck trailer hitch embodiment shown in FIGS. 6-10B in that the trailer hitch system 360 may be similarly adaptable to a conventional gooseneck trailer hitch. As such, the teachings of the present disclosure may allow a conventional hitching operation of a gooseneck trailer hitch to substantially simultaneously connect electrical, hydraulic, coolant, or compressed air connections of a tow vehicle with corresponding connections of a trailer. FIG. 21 shows an environmental view of a towing operation 352. In the towing operation 352 depicted, a trailer 354 is connected to a tow vehicle 356 using a gooseneck trailer hitch modified according to an embodiment of the present disclosure. FIG. 22 is an enlarged view of the trailer hitch system 360 of FIG. 21 showing its features in more detail.

Figure 25A:
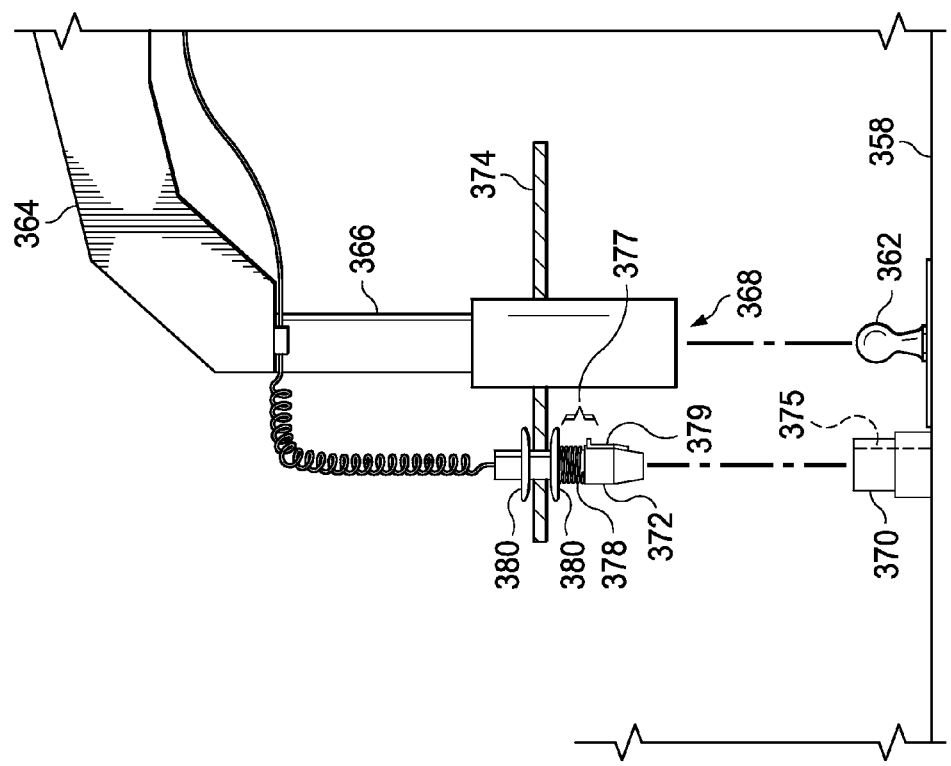
FIG. 25A is an elevation view of the unhitched gooseneck trailer hitch system shown in FIG. 22 according to an embodiment of the present disclosure.

The trailer hitch system 360 may include a ball 362 that may be mounted in the middle of a bed 358 of the tow vehicle 356 (see FIG. 25A). The ball 362 may be sized to fit within a socket 368 when the trailer 354 is hitched to the tow vehicle 356. A locking mechanism may be pulled under the ball 362 by a lever. Safety chains may be used to ensure that if the ball 362 and the socket 368 become unintentionally disconnected, the trailer 354 will not completely separate from the tow vehicle 356. The ball 362 and socket 368 mounting configuration may allow the trailer 354 sufficient freedom to pivot with respect to the tow vehicle 356 during the towing operation 352.

According to an embodiment of the present disclosure, a tow vehicle connector 370 may be generally fixed to the bed 358 of the tow vehicle 356 proximate the ball 362. The tow vehicle connector 370 may be generally rigidly mounted to the bed 358 of the tow vehicle 356. In other embodiments, a bracket or other mounting feature may be used to mount the tow vehicle connector 370 to the bed 358. The tow vehicle connector 370 may be positioned to allow it to be connected to a trailer connector 372 when the trailer 354 is connected to the tow vehicle 356. The tow vehicle connector 370 may allow power for lighting and breaking to be transmitted from the tow vehicle 356 to the trailer 354.

In certain embodiments, the tow vehicle connector 370 may be a hydraulic, coolant, or compressed air connection. The tow vehicle connector 370 may be adjustable vertically and horizontally to allow manual adjustment of the height of the distance the tow vehicle connector 370 extends from the bed 358 or the distance away from the ball 362. The tow vehicle connector 370 may be similar to a conventional electrical connection found on vehicles equipped to tow a trailer or other equipment.

On the trailer 354 side of the trailer hitch system 360, there may be a trailer connector 372 generally positioned by a trailer connector plate 374. The trailer connector plate 374 may generally be formed from any suitable materials, such as aluminum, steel, or other metal. The material of the trailer connector plate 374 may be any suitable thickness that allows for structural stability. For example, in some embodiments, the trailer connector plate 374 is formed of ⅛-inch thick aluminum or steel. In other embodiments, all or part of the trailer connector plate 374 may be plastic or other synthetic material. The trailer connector plate 374 may generally position the trailer connector 372 where it may be mated with the tow vehicle connector 370. In certain embodiments, the trailer connector plate 374 may be welded or otherwise fixed to a downward extending member 366 of the neck 364 of the trailer 356. The trailer connector plate 374 may generally be a circular, disk shape. In certain embodiments, the trailer connector plate 374 may be semi-circular. The teachings of the present disclosure contemplate any suitable shape of the trailer connector plate 374, including, for example, a semi-circular shape or other arced shape. The arc radius of the trailer connector plate 374 may be generally centered on an axial centerline of the ball 362 when hitched.

The trailer connector plate 374 may define a slot 376. The slot 376 may allow the trailer connector plate 374 and the attached trailer 354 to rotate (yaw) about the trailer connector 372 when the trailer 354 is towed around a corner or is otherwise subjected to forces that cause it to pivot relative to the tow vehicle 356. The slot 376 may generally follow the arc shape of the trailer connector plate 374 and its radius may also be centered on an axial centerline of the ball 362. The slot 376 may constrain the motion of the trailer connector 372 while maintaining the freedom to allow the trailer connector plate 374 to rotate about the trailer connector 372 when the trailer 354 turns behind the tow vehicle 356.

The slot 376 may define a curvilinear path in which the trailer connector 372 may be free to move. In certain embodiments, the slot 376 may extend sufficiently to allow the trailer 354 to rotate through an angle of approximately 180°, plus or minus 90°, with respect to the tow vehicle 356. Accordingly, the slot 376 may form an approximately 180° or any suitable greater angle having a vertex aligned with the axial centerline of the ball 362. Similar to the fifth wheel hitch embodiment, the rotational limits of the slot 376 may not serve to limit the rotational motion of the trailer 354. Rather, the slot 376 may extend sufficiently to allow at least a 90° rotation of the trailer 354 about either side of the tow vehicle 356 in the event of a jackknife situation.

In certain embodiments, the slot 376 may be approximately three-fourths of an inch wide. This length may be particularly suitable to accommodate any suitable connector or connector backshell of the trailer 354. The trailer connector plate 374 may be disposed substantially parallel to the bed 358 of the tow vehicle 356 to allow proper mating with tow vehicle connector 370.

Figure 23:
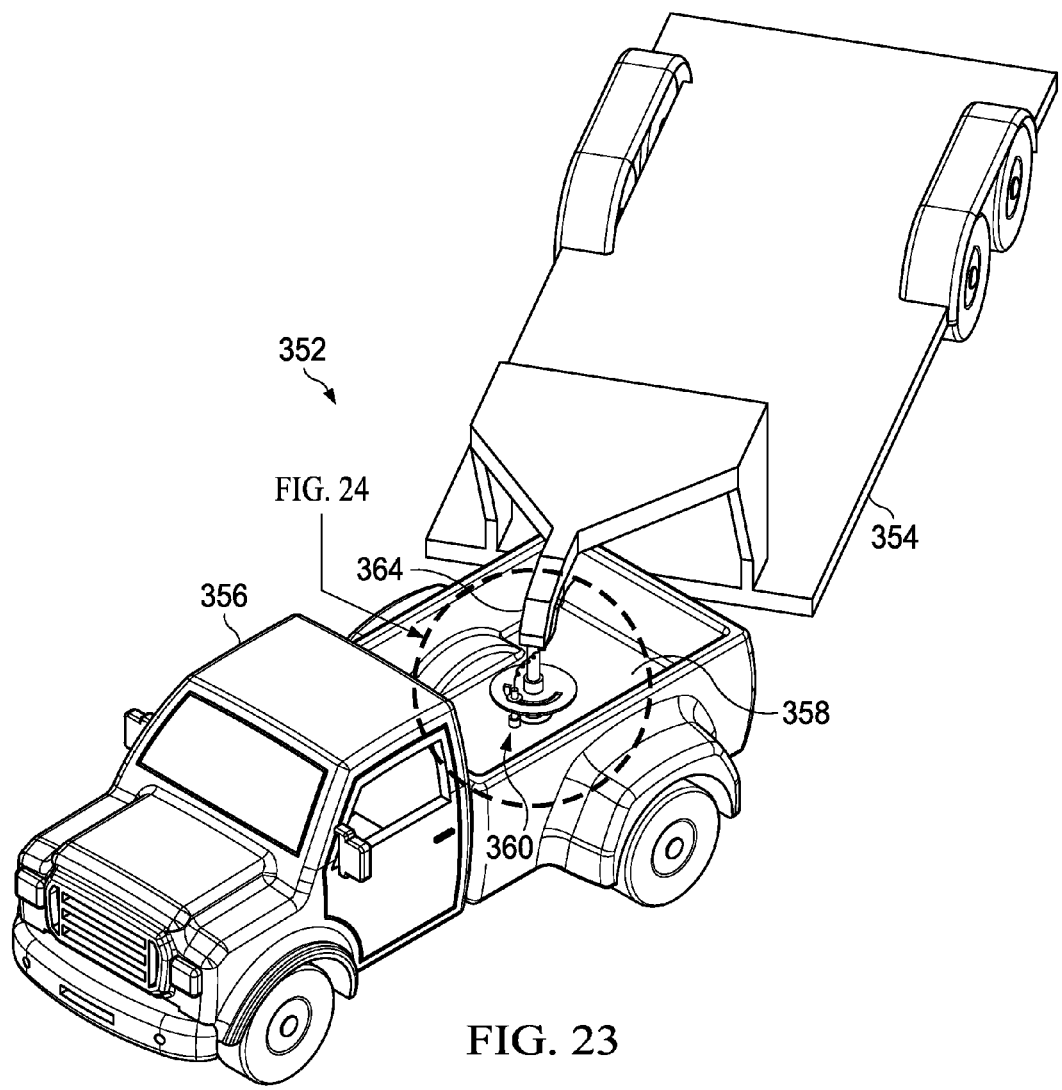
FIG. 23 is a perspective view of the gooseneck trailer hitch system shown in FIG. 21 showing the trailer pivoted with respect to the tow vehicle according to an embodiment of the present disclosure.
Figure 24:
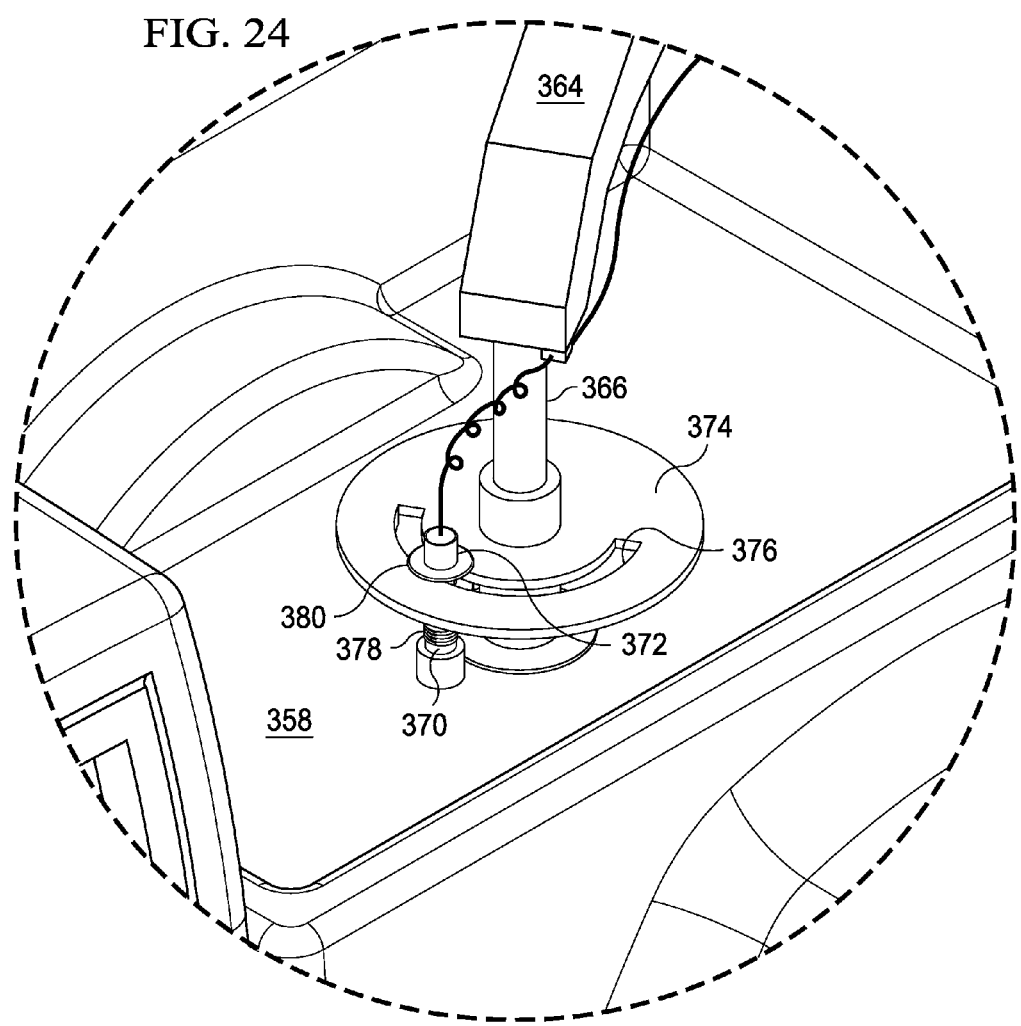
FIG. 24 is a detailed view of the gooseneck trailer hitch system shown in FIG. 22 according to an embodiment of the present disclosure.

The trailer hitch system 360 may further comprise at least one retention spring 378. The retention spring 378 may be coupled to and disposed around the trailer connector 372. The retention spring 378 may be substantially similar to the retention spring 244 described with respect to FIGS. 16-20B. In an embodiment, the retention spring is constrained longitudinally within a recessed area 377 (see FIG. 25A) in the wall of the trailer connector 272. The retention spring 378 may be any suitable size and strength linear spring. In certain embodiments, the retention spring 378 may have a sufficient spring constant to enable positioning the trailer connector 372 to any desired location in the slot 376 and then maintaining the trailer connector 372 in that desired location. During the towing operation 352, the elasticity of the retention spring 378 may allow motion of the trailer connector 372 with respect to the trailer connector plate 374 constrained by the slot 376. As illustrated in FIGS. 23 and 24, the trailer 354 may rotate on a generally horizontal plane with respect to the tow vehicle 356. This may be referred to as a yaw motion. In an embodiment, the recessed area 377 of the trailer connector 372 may have slightly flat surfaces on the sides that engage the slot 376 such that the inner diameter of the trailer connector 272 in the recessed area 377 is slightly smaller than the width of the slot 276 within which the trailer connector 272 moves, thereby inhibiting twisting or rotation of the trailer connector 272 within the slot 276.

FIGS. 25A and 25B illustrate the mating of the trailer connector 372 with the tow vehicle connector 374. One or more optional flanges 380 may assist mating the trailer connector 372 with the tow vehicle connector 374. One flange 380 may be positioned on a top side of the trailer connector plate 374, and another flange 380 may be positioned on a bottom side of the trailer connector plate 374. The retention spring 378 may engage the flange 380 positioned on the bottom side of the trailer connector plate 374. In such an embodiment, the flange 380 provides a smooth surface and a larger surface area against which the retention spring 378 exerts force against the trailer connector plate 374.

Prior to connection, the ball 362 and the socket 368 may be aligned. Also, the trailer connector 372 may be vertically aligned with the tow vehicle connector 370. In an embodiment, the trailer connector 372 comprises a key 379 designed to engage a key slot 375 on the tow vehicle connector 370 to ensure proper alignment when the two connectors 370, 372 are coupled together. Further the retention spring 378 on the trailer connector 372 is expanded against the trailer connector plate 374, either directly or via flange 380, to hold the trailer connector 372 in place within the slot 376 of the trailer connector plate 374. Moreover, in the embodiment where surfaces of the recessed area 377 on the trailer connector 372 are slightly flat and the diameter of the recessed area 377 is slightly smaller than the width of the slot 376, the trailer connector 372 is prevented from twisting or rotating within the slot 376 such that the key 379 on the trailer connector 372 remains oriented with the key slot 375 on the tow vehicle connector 370.

As the neck 364 of trailer 354 is lowered toward the ball 362 of the tow vehicle 356, the ball 362 may fit into the socket 368. Approximately simultaneously, the tow vehicle connector 370 may be connected to the trailer connector 372. In certain embodiments, the tow vehicle connector 370 may exert a force on the trailer connector 372 opposite the direction of motion of the trailer connector 372. The flange 380 on the bottom side of the trailer connector plate 374 may oppose this force. These forces may allow the tow vehicle connector 370 to mate with the trailer connector 372 as the trailer 354 is lowered toward the tow vehicle 356. Once connectors 370, 372 are mated, the retention spring 378 is at least partially compressed and operates to keep a substantially constant force on the connectors 370, 372 to maintain the connection. The retention spring 378 may further be operable to absorb shock and inhibit rattling between the connectors 370, 372 due to any mechanical clearance therebetween.

The flange 380 may also assist in decoupling the trailer connector 372 from the tow vehicle connector 370. The trailer connector plate 374 may exert a force on the flange 380 on the top side of the trailer connector plate 374 and cause the tow vehicle connector 370 to disconnect from the trailer connector 372 as the trailer 354 is raised away from the tow vehicle 356. A spring force from a spring mechanism integral to the trailer connector 372 and/or tow vehicle connector 370 may keep the connectors engaged.

The trailer connector 372 and the tow vehicle connector 370 may be any suitable multi-conductor connectors. In certain embodiments, the connectors 372 and 370 may be male and female seven-way electrical connectors. In other embodiments, the trailer connector 372 and the tow vehicle connector 370 may be any suitable hydraulic, coolant, or compressed air connectors. In certain embodiments, the conventional trailer electrical connection used to supply power to the trailer 354 may be plugged into a receiver or jumper located on the trailer 354, for example on the neck 364. An electrical cable may run from this connection to the trailer connector 372 according to an embodiment of the present disclosure. In alternate embodiment, a conventional electrical connector may be received by slot 376 and generally become the trailer connector 372.

It should be understood from the figures and descriptions herein that the embodiments of the trailer hitch systems of the present disclosure may be compatible with existing conventional fifth wheel and gooseneck trailer hitching systems. Moreover, if a trailer or tow vehicle is equipped with its respective portion of the trailer hitching systems of the present disclosure, it may nevertheless be compatible with a trailer or tow vehicle that may not be equipped with the trailer hitching systems of the present disclosure.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Numerous other changes, substitutions, variations, alterations, and modifications may be ascertained by those skilled in the art, and it is intended that the present invention encompass all such changes, substitutions, variations, alterations, and modifications as falling within the spirit and scope of the appended claims.

What is claimed is:

1. A system for connecting a power supply of a tow vehicle to a trailer, comprising:
   a connector plate coupled to a hitching member, the connector plate defining a curvilinear slot receiving a first connector, the curvilinear slot allowing the connector plate to rotate with respect to the first connector; and
   a retention spring coupled to the first connector;
   the hitching member being a tongue of a fifth wheel trailer;
   the first connector being a trailer connector;
   the connector plate extending from the tongue; and
   a tow vehicle connector bracket coupled to a tow vehicle and coupled to a tow vehicle connector, the tow vehicle connector configured to communicate power from the tow vehicle to the fifth wheel trailer.

2. The system of claim 1, further comprising:
   a first flange coupled to the first connector on a first side of the connector plate; and a second flange coupled to the first connector on a second side of the connector plate, the second side being opposite the first side.

3. The system of claim 1, wherein the first connector is an electrical connector.

4. The system of claim 1, wherein the first connector is selected from the group consisting of a hydraulic connector, a coolant connector, and a compressed air connector.

5. A method of connecting a power supply to a trailer using the system of claim 1, the method comprising:
aligning the first connector with the tow vehicle connector;
mating a hitch pin coupled to the trailer with a receiving slot on the tow vehicle; and
connecting the first connector with the tow vehicle connector substantially simultaneously with the mating of the hitch pin and the receiving slot.

6. The method of claim 5, further comprising:
communicating power between the first connector and the tow vehicle connector.

7. The method of claim 5, further comprising:
exerting a spring force on the connected first connector and tow vehicle connector to maintain the connection.

8. The method of claim 5, further comprising allowing the connector plate to rotate about the first connector as the trailer rotates with respect to the tow vehicle.

9. A system for connecting a power supply of a tow vehicle to a trailer, comprising:
a connector plate coupled to a hitching member of a trailer, the connector plate defining a curvilinear slot receiving a trailer connector, the curvilinear slot allowing the connector plate to rotate with respect to the trailer connector;
a retention spring coupled to the trailer connector; and
a tow vehicle connector coupled to a tow vehicle, the tow vehicle connector configured to communicate power from the tow vehicle to the trailer;
wherein the trailer is a gooseneck trailer and further comprising:
the hitching member being a downward extending member of the gooseneck trailer, the downward extending member defining a socket to receive a ball coupled to a tow vehicle;
the connector plate extending horizontally from the downward extending member; and
the curvilinear slot having a radius, the radius having an endpoint aligned with an axial centerline of the downward extending member.

10. The system of claim 9, wherein the trailer connector and the tow vehicle connector are electrical connectors.

11. The system of claim 9, further comprising:
a first flange coupled to the trailer connector on a first side of the connector plate; and
a second flange coupled to the trailer connector on a second side of the connector plate, the second side being opposite the first side.

12. A method of connecting a power supply to a trailer using the system of claim 9, the method comprising:
aligning the trailer connector with the tow vehicle connector;
mating the socket on the trailer with the ball on the tow vehicle; and
connecting the trailer connector with the tow vehicle connector substantially simultaneously with the mating of the socket and the ball.

13. A system for connecting a power supply of a tow vehicle to a trailer, comprising:
a connector plate coupled to a hitching member, the connector plate defining a curvilinear slot receiving a first connector, the curvilinear slot allowing the connector plate to rotate with respect to the first connector; and
a retention spring coupled to the first connector;
the hitching member being a downward extending member of a gooseneck trailer, the downward extending member defining a socket to receive a ball coupled to a tow vehicle;
the connector plate extending from the downward extending member; and
the curvilinear slot having a radius, the radius having an endpoint configured to be aligned with an axial centerline of the ball of the tow vehicle.

14. The system of claim 13, further comprising:
a tow vehicle connector bracket coupled to a tow vehicle and coupled to a tow vehicle connector, the tow vehicle connector configured to communicate power from the tow vehicle to the gooseneck trailer.

15. The system of claim 13, further comprising:
a first flange coupled to the first connector on a first side of the connector plate; and
a second flange coupled to the first connector on a second side of the connector plate, the second side being opposite the first side.

16. The system of claim 13, wherein the first connector is an electrical connector.

17. The system of claim 13, wherein the first connector is selected from the group consisting of a hydraulic connector, a coolant connector, and a compressed air connector.

18. A method of connecting a power supply to a trailer using the system of claim 13, the method comprising:
aligning the first connector with a tow vehicle connector;
mating the socket on the trailer with the ball on the tow vehicle; and
connecting the first connector with the tow vehicle connector substantially simultaneously with the mating of the socket and the ball.

19. The method of claim 18, further comprising:
communicating power between the first connector and the tow vehicle connector.

20. The method of claim 18, further comprising:
exerting a spring force on the connected first connector and tow vehicle connector to maintain the connection.

* * * * *